(12) United States Patent
Kobuya et al.

(10) Patent No.: US 8,972,186 B2
(45) Date of Patent: *Mar. 3, 2015

(54) ELECTRONIC GUIDE SYSTEM, CONTENTS SERVER FOR ELECTRONIC GUIDE SYSTEM, PORTABLE ELECTRONIC GUIDE DEVICE, AND INFORMATION PROCESSING METHOD FOR ELECTRONIC GUIDE SYSTEM

(71) Applicant: Sony Corporation, Tokyo (JP)

(72) Inventors: Naoshi Kobuya, Tokyo (JP); Toru Masano, Kagawa (JP); Motoya Itako, Tokyo (JP); Atsushi Noda, Tokyo (JP); Hiroshi Nagasawa, Tokyo (JP)

(73) Assignee: Sony Corporation (JP)

( * ) Notice: Subject to any disclaimer, the term of this patent is extended or adjusted under 35 U.S.C. 154(b) by 16 days.

This patent is subject to a terminal disclaimer.

(21) Appl. No.: 13/748,118

(22) Filed: Jan. 23, 2013

(65) Prior Publication Data

US 2013/0179076 A1 Jul. 11, 2013

Related U.S. Application Data

(63) Continuation of application No. 12/751,069, filed on Mar. 31, 2010, now Pat. No. 8,386,165, which is a continuation of application No. 10/632,871, filed on Aug. 1, 2003, now Pat. No. 8,010,279.

(30) Foreign Application Priority Data

Aug. 5, 2002 (JP) ................................ 2002-227799

(51) Int. Cl.
*G01C 21/00* (2006.01)
*G06F 3/048* (2013.01)
(Continued)

(52) U.S. Cl.
CPC ................ *G01C 21/00* (2013.01); *G01C 21/36* (2013.01); *G06F 17/3087* (2013.01);
(Continued)

(58) Field of Classification Search
CPC ..... G01C 21/00; G06F 3/048; G06F 3/04817; G06F 3/04842; G06F 3/017
USPC .......... 701/533, 409; 340/990, 995.1, 995.14, 340/995.17; 382/305, 306; 455/456.3, 457
See application file for complete search history.

(56) References Cited

U.S. PATENT DOCUMENTS 5,113,185 A  5/1992 Ichikawa
5,197,009 A  3/1993 Hoffman, Jr. et al.
(Continued)

FOREIGN PATENT DOCUMENTS

JP  11-272381 A  10/1999
JP  2000-200282 A  7/2000
(Continued)

*Primary Examiner* — Tuan C. To
(74) *Attorney, Agent, or Firm* — Lerner, David, Littenberg, Krumholz & Mentlik, LLP

(57) ABSTRACT

Tour guide contents stored in a tour guide apparatus carried by a user at a tour destination are provided with points of interest information and map data. This information includes latitude and longitude information for the site of each point of interest, and information on the providers of the information and the categories of information. The latitude and longitude information is provided for each site in relation to map data. By matching these pieces of latitude and longitude information to the map data, points of interest information can be laid out on the map and displayed. This makes it possible to select interesting site information to be displayed on the map based on the information provider, for example, points of interest information provided by provider A for restaurants and another set of information provided by provider B for hotels.

20 Claims, 26 Drawing Sheets

(51) Int. Cl.
- *G01C 21/36* (2006.01)
- *G06F 17/30* (2006.01)
- *G09B 29/00* (2006.01)
- *H04L 29/06* (2006.01)
- *H04W 4/02* (2009.01)
- *H04W 4/20* (2009.01)
- *H04L 29/08* (2006.01)

(52) U.S. Cl.
CPC .......... *G09B 29/007* (2013.01); *G09B 29/008* (2013.01); *H04L 29/06* (2013.01); *H04W 4/02* (2013.01); *H04W 4/20* (2013.01); *G06F 3/048* (2013.01); *H04L 67/18* (2013.01); *H04L 67/327* (2013.01); *H04L 69/329* (2013.01)
USPC ........ 701/533; 701/409; 340/990; 340/995.1; 382/305; 455/456.3; 455/457

(56) References Cited

U.S. PATENT DOCUMENTS

| | | |
|---|---|---|
| 5,249,053 A | 9/1993 | Jain |
| 5,329,108 A | 7/1994 | Lamoure |
| 5,436,974 A | 7/1995 | Kovanen |
| 5,553,211 A | 9/1996 | Uotani |
| 5,576,757 A | 11/1996 | Roberts et al. |
| 5,651,107 A | 7/1997 | Frank et al. |
| 5,751,245 A | 5/1998 | Janky et al. |
| 5,805,163 A | 9/1998 | Bagnas |
| 5,835,682 A | 11/1998 | Broomhead et al. |
| 5,857,066 A | 1/1999 | Wyche et al. |
| 5,913,078 A | 6/1999 | Kimura et al. |
| 5,929,932 A | 7/1999 | Otsuki et al. |
| 5,948,040 A | 9/1999 | DeLorme et al. |
| 6,199,014 B1 | 3/2001 | Walker et al. |
| 6,304,819 B1 | 10/2001 | Agnew et al. |
| 6,330,537 B1 | 12/2001 | Davis et al. |
| 6,330,976 B1 | 12/2001 | Dymetman et al. |
| 6,369,830 B1 | 4/2002 | Brunner et al. |
| 6,385,539 B1 | 5/2002 | Wilson et al. |
| 6,400,375 B1 * | 6/2002 | Okudaira .................. 345/668 |
| 6,418,430 B1 * | 7/2002 | DeFazio et al. ................... 1/1 |
| 6,424,933 B1 * | 7/2002 | Agrawala et al. ................ 703/2 |
| 6,429,883 B1 | 8/2002 | Plow et al. |
| 6,466,237 B1 * | 10/2002 | Miyao et al. .................. 715/838 |
| 6,512,564 B1 | 1/2003 | Yoshida et al. |
| 6,518,944 B1 | 2/2003 | Doane et al. |
| 6,548,218 B1 | 4/2003 | Kukimoto et al. |
| 6,615,175 B1 * | 9/2003 | Gazdzinski .................. 704/275 |
| 6,622,082 B1 | 9/2003 | Schmidt et al. |
| 6,628,283 B1 * | 9/2003 | Gardner .................. 345/427 |
| 6,637,029 B1 | 10/2003 | Maissel et al. |
| 6,681,045 B1 * | 1/2004 | Lapstun et al. .............. 382/187 |
| 6,704,034 B1 * | 3/2004 | Rodriguez et al. ............ 715/860 |
| 6,727,807 B2 | 4/2004 | Trajkovic et al. |
| 6,798,378 B1 | 9/2004 | Walters |
| 6,865,302 B2 | 3/2005 | Chang |
| 6,868,337 B2 | 3/2005 | Muramatsu |
| 6,904,160 B2 | 6/2005 | Burgess |
| 6,921,351 B1 | 7/2005 | Hickman et al. |
| 6,982,727 B2 | 1/2006 | Baer et al. |
| 6,983,420 B1 | 1/2006 | Itou et al. |
| 6,988,279 B1 * | 1/2006 | Kanevsky ..................... 726/2 |
| 6,996,783 B2 | 2/2006 | Brown et al. |
| 7,010,177 B1 | 3/2006 | Mattison |
| 7,036,085 B2 | 4/2006 | Barros |
| 7,054,488 B2 | 5/2006 | White et al. |
| 7,130,466 B2 * | 10/2006 | Seeber ..................... 382/218 |
| 7,307,636 B2 | 12/2007 | Matraszek et al. |
| 7,454,090 B2 | 11/2008 | Wilcock et al. |
| 7,487,529 B1 | 2/2009 | Orlick |
| 7,559,034 B1 | 7/2009 | Paperny et al. |
| 7,747,560 B2 | 6/2010 | Goldthwaite et al. |
| 8,270,666 B2 | 9/2012 | Nielsen et al. |
| 2001/0005809 A1 | 6/2001 | Ito |
| 2001/0016849 A1 | 8/2001 | Squibbs |
| 2001/0041980 A1 | 11/2001 | Howard et al. |
| 2002/0032523 A1 * | 3/2002 | Sakashita .................. 701/211 |
| 2002/0051576 A1 | 5/2002 | Choi et al. |
| 2002/0062360 A1 | 5/2002 | Ishiguro |
| 2002/0065605 A1 | 5/2002 | Yokota |
| 2002/0091568 A1 | 7/2002 | Kraft et al. |
| 2002/0091793 A1 | 7/2002 | Sagie |
| 2002/0093435 A1 | 7/2002 | Baron |
| 2002/0097893 A1 * | 7/2002 | Lee et al. .................. 382/103 |
| 2002/0101557 A1 | 8/2002 | Ono et al. |
| 2002/0103813 A1 | 8/2002 | Frigon |
| 2002/0107718 A1 * | 8/2002 | Morrill et al. ................. 705/10 |
| 2002/0113921 A1 | 8/2002 | Jiang et al. |
| 2002/0114522 A1 * | 8/2002 | Seeber .................... 382/218 |
| 2002/0156686 A1 * | 10/2002 | Kraft et al. ................. 705/26 |
| 2002/0163547 A1 * | 11/2002 | Abramson et al. ............ 345/855 |
| 2002/0165662 A1 | 11/2002 | Maruyama et al. |
| 2002/0184200 A1 | 12/2002 | Ueda et al. |
| 2002/0191867 A1 | 12/2002 | Le et al. |
| 2002/0196986 A1 * | 12/2002 | McIntyre .................. 382/299 |
| 2003/0008661 A1 | 1/2003 | Joyce et al. |
| 2003/0028451 A1 * | 2/2003 | Ananian ................... 705/27 |
| 2003/0036843 A1 * | 2/2003 | Okude et al. ............... 701/200 |
| 2003/0097374 A1 | 5/2003 | Himeno |
| 2003/0160812 A1 | 8/2003 | Dommer et al. |
| 2004/0030741 A1 * | 2/2004 | Wolton et al. ............... 709/202 |
| 2004/0111669 A1 | 6/2004 | Rossmann et al. |
| 2004/0138806 A1 * | 7/2004 | Ichida ..................... 701/200 |
| 2004/0204821 A1 | 10/2004 | Tu |
| 2004/0221244 A1 | 11/2004 | Baldino |
| 2006/0129636 A1 | 6/2006 | Matsuura et al. |

FOREIGN PATENT DOCUMENTS

| | | |
|---|---|---|
| JP | 2001333372 A * | 11/2001 |
| JP | 2002056651 A * | 2/2002 |
| JP | 2002-123170 A | 4/2002 |
| JP | 2002-157433 A | 5/2002 |
| JP | 2002185889 A | 6/2002 |
| JP | 2002197014 A | 7/2002 |
| WO | WO 0189221 A1 * | 11/2001 |

* cited by examiner

FIG. 2A
MEMBER DATABASE

| USER ID | PASSWORD | PERSONAL INFORMATION | RENTAL INFORMATION |
|---|---|---|---|
| 1 2 3 4 | * * * * | NAME, E-MAIL ADDRESS, ETC. | GUIDE INFORMATION ID, DEPARTURE DATE, ETC. |
| 5 6 7 8 | * * * * | . . . | . . . |
| . . . | . . . | . . . | . . . |

FIG. 2B
GUIDE INFORMATION DATABASE

| DESTINATION | COURSE NAME | ID | GUIDE INFORMATION |
|---|---|---|---|
| HAWAII | ○○ | 11 | COMMENT INFORMATION, PICTURE IMAGE INFORMATION, POI, BASIC LOCAL INFORMATION, ETC. |
| | ×× | 12 | . . . |
| | . . . | | . . . |
| ROME | △○ | 21 | . . . |
| | . . . | | . . . |
| . . . | . . . | | . . . |

FIG. 2C
USER INFORMATION

| USER ID | USER INFORMATION |
|---|---|
| 1 2 3 4 | MEMO, REGISTERED FAVORITE INFORMATION |
| 5 6 4 8 | . . . |
| . . . | . . . |

FIG. 2D
TOUR RECORD INFORMETION

| USER ID | TOUR RECORD INFORMATION |
|---|---|
| 1 2 3 4 | ACTION HISTORY, PICTURE IMAGE DATA, MEMO INFORMATION DURING TOUR, . . . |
| . . . | . . . |
| . . . | . . . |

FIG. 8

```
<poi>
    <pos>
        <lat>35.6550</lat>
        <lon>139.5487</lon>
    </pos>
    <name>
        <nb>STATUE OF KING KAMEHAMEHA</nb>
    </name>
    <information>
        <information-text>STATUE OF KING
KAMEHAMEHA WHO UNIFIED HAWAII・・・・・
・・  </information-text>
    </information>
</poi>
<linkfile>
    <text href="...../memo.txt">
    </text>
<linkfile>
```

```
              memo.txt
   STRONGLY RECOMMENDED
```

F I G. 17
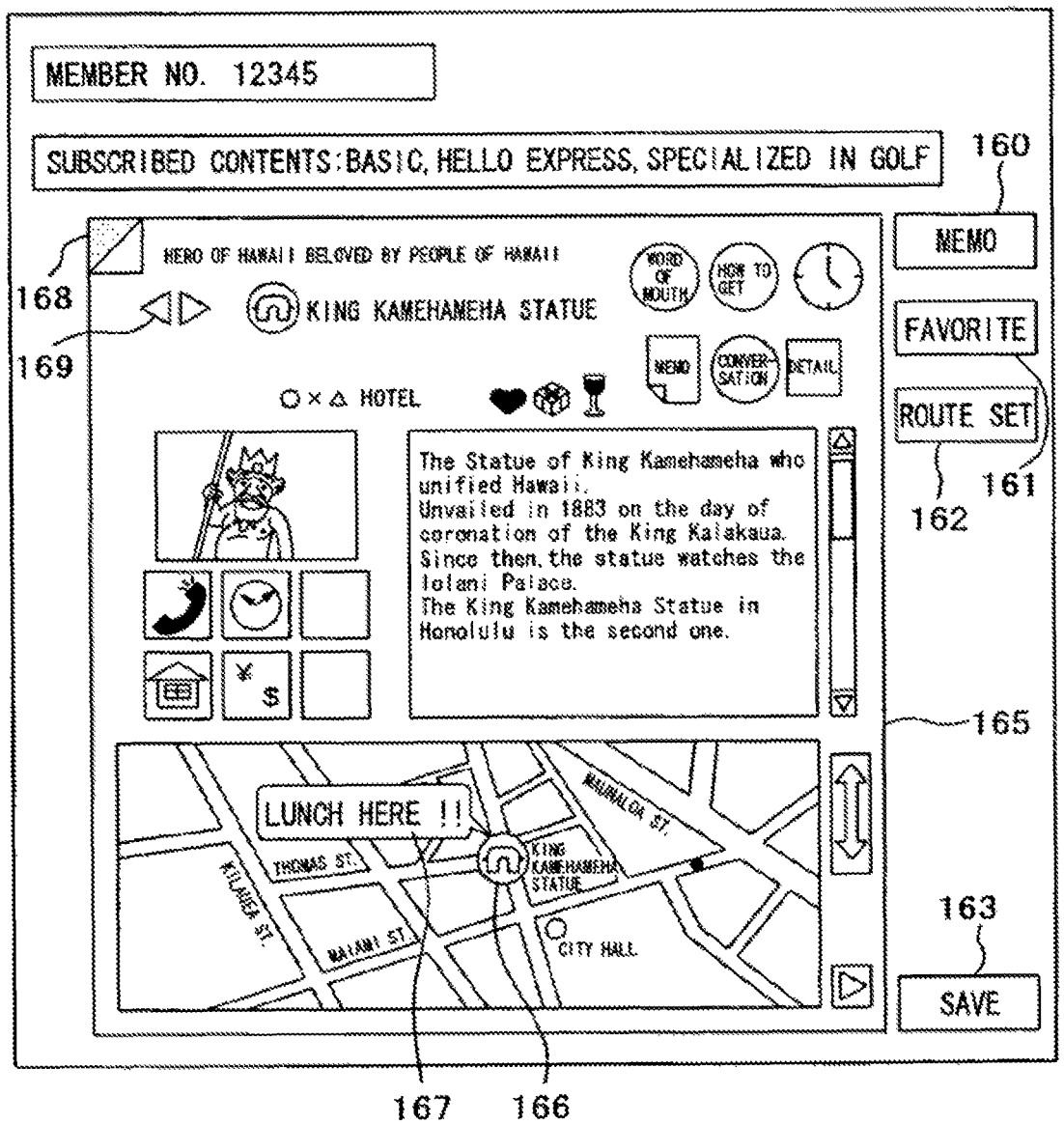

F I G. 18
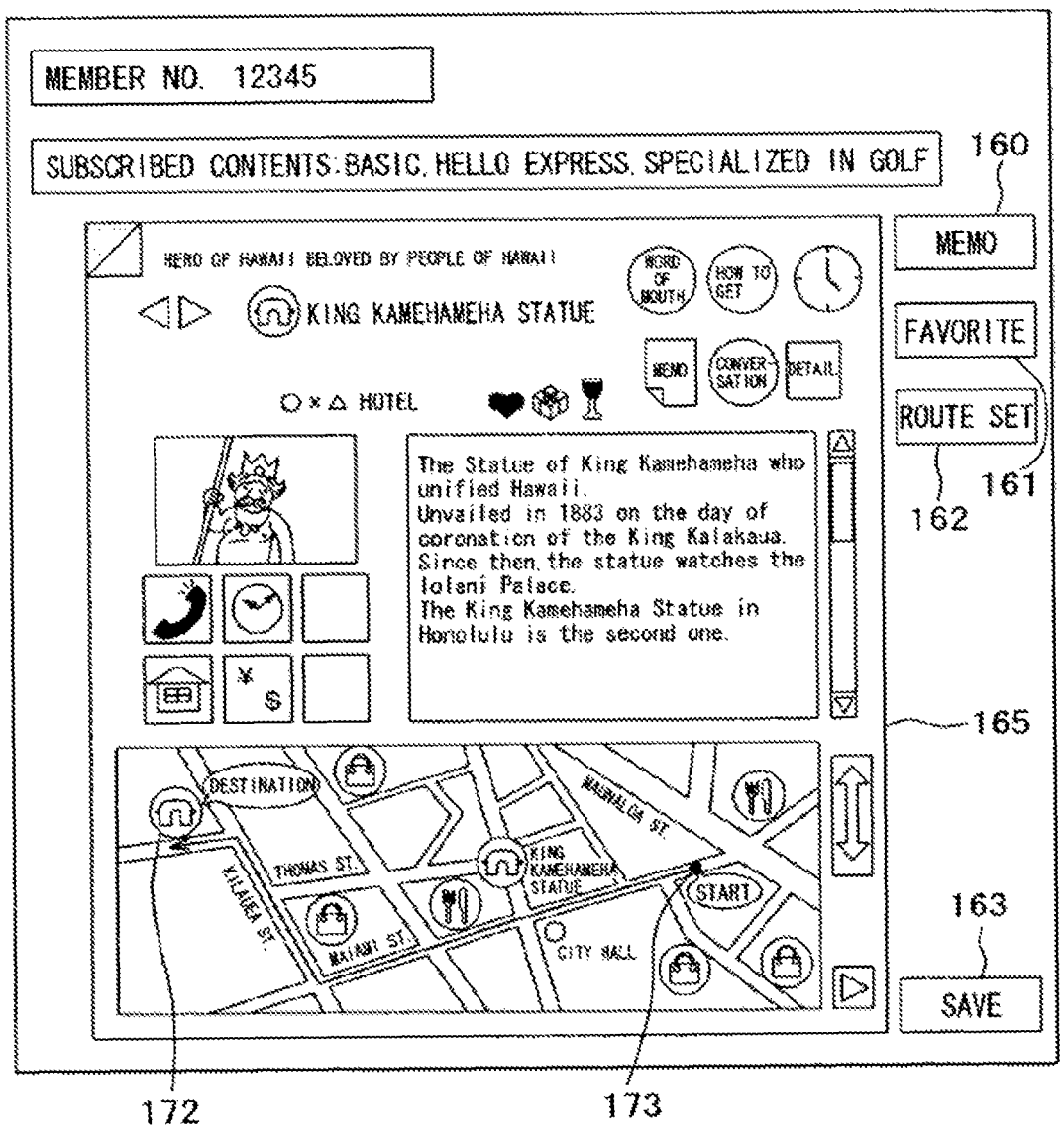

FIG. 21

```
                    ┌─────────────────┐
                    │  BULLETIN BOARD │
                    └─────────────────┘
┌──────────────────────────────┐
│ MEMBER NO. 12345             │
└──────────────────────────────┘

🌴 WENT TO HAWAII!  ARAPYON  2002/5/10 00:21:18 No. 300

🌴 TRIP BY THREE GUYS  NOTCH  2002/5/20 10:26:10 No. 321
    ⇒GREAT TOUR!  SHIGESHIGE  2002/5/21 22:16:20 No. 345
      ⇒ENEMY OF WOMAN  RUMI  2002/5/23 23:56:11 No. 234

🌴 DISCLOSE DIARY FOR 6 DAYS-4 NIGHTS TOUR TO HAWAII  KONBU
                                  2002/5/24 19:19:19 No. 523

🌴 DRIVE IS THE BEST IN HAWAII  MONTOYA  2002/5/24 20:12:44 No. 196
    ⇒TEACH ME BETTER WAY TO USE A RENTAL CAR  ATTSU
                                  2002/5/25 22:22:23 No. 333
      ⇒INSURANCE IS NECESSARY  MONTOYA  2002/5/26 01:01:13 No. 196
```

FIG. 24

| ITEM ID | INFORMATION PROVIDER | UPDATE | COUNTRY | CITY | MAIN CLASS | MIDDLE CLASS | SUB CLASS | JAPANESE | TEXT INFORMATION | PHOTO AD, COUPON | LATITUDE | LONGITUDE |
|---|---|---|---|---|---|---|---|---|---|---|---|---|
| ... | ... | ... | ... | ... | ... | ... | ... | ... | ... | ... | ... | ... |
| 13006001 | A COMPANY | 2002/05/06 | US | WAIKIKI | EAT | RESTAURANT | CHINESE | ﾍﾞｷﾝ | 1231.TXT | 26001.JPG | 77429667 | -567025485 |
| 13005011 | A COMPANY | 2002/06/12 | US | WAIKIKI | BUY | DUTY-FREE SHOP | CRAFT | ｷｶﾞｲ | 1254.TXT | 25041.JPG | 77422491 | -567065487 |
| 13007036 | B COMPANY | 2002/01/18 | US | WAIKIKI | STAY | HOTEL | HOTEL | ﾊｸﾗﾆ | 1266.TXT | 23002.JPG | 77423564 | -567026547 |
|  | C COMPANY | 2002/03/24 | US | WAIKIKI | STAY | HOTEL | HOTEL | ﾊｸﾗﾆ | 1218.TXT | 23021.JPG |  |  |
| 13008045 | A COMPANY | 2002/04/08 | US | WAIKIKI | BUY | DUTY-FREE SHOP | LIQUOR SHOP | ｱｼﾞｱ | 1233.TXT | 23036.JPG | 77425421 | -567038547 |
|  | B COMPANY | 2002/05/30 | US | WAIKIKI | BUY | DUTY-FREE SHOP | DUTY-FREE SHOP | ｱｼﾞｱ | 1225.TXT | 26032.JPG |  |  |
|  | C COMPANY | 2002/04/16 | US | WAIKIKI | BUY | DUTY-FREE SHOP | DUTY-FREE SHOP | ｱｼﾞｱ | 1211.TXT | 23014.JPG |  |  |
| 13002556 | B COMPANY | 2002/02/08 | US | WAIKIKI | PLAY | CASINO | CASINO | ﾊﾞｶﾞｽ | 1208.TXT | 24002.JPG | 77426245 | -567025476 |
| 13003786 | C COMPANY | 2002/02/05 | US | WAIKIKI | PLAY | MOVIE THEATER | MOVIE THEATER | ｱｲﾃｱﾀｰ | 1214.TXT | 25031.JPG | 77423478 | -567046587 |
| 13001897 | B COMPANY | 2002/03/25 | US | WAIKIKI | EAT | COFFEE SHOP | COFFEE SHOP | ﾎﾟﾄ | 1262.TXT | 25026.JPG | 77423895 | -567025698 |
| ... | ... | ... | ... | ... | ... | ... | ... | ... | ... | ... | ... | ... |

F I G. 25

|  | RESTAURANT | HOTEL | DUTY-FREE SHOP | MUSEUM |
|---|---|---|---|---|
| A COMPANY | ○ |  |  |  |
| B COMPANY |  | ○ |  | ○ |
| C COMPANY |  |  | ○ |  |

○ RESTAURANT GUIDE INFORMATION FOR A COMPANY
△ HOTEL GUIDE INFORMATION FOR B COMPANY
□ DUTY-FREE SHOP GUIDE INFORMATION FOR C COMPANY

ELECTRONIC GUIDE SYSTEM, CONTENTS SERVER FOR ELECTRONIC GUIDE SYSTEM, PORTABLE ELECTRONIC GUIDE DEVICE, AND INFORMATION PROCESSING METHOD FOR ELECTRONIC GUIDE SYSTEM

CROSS REFERENCE TO RELATED APPLICATION

This application is a continuation of U.S. application Ser. No. 12/751,069, filed on Mar. 31, 2010, which is a continuation of U.S. application Ser. No. 10/632,871, filed on Aug. 1, 2003, which claims priority from Japanese Application No. 2002-227799, filed on Aug. 5, 2002, the disclosures of which are hereby incorporated by reference herein.

BACKGROUND OF THE INVENTION

The present invention relates to an information processing apparatus, and, for example, to an electronic guide apparatus which can customize on a server, beforehand, contents such as tour guide contents stored in the electronic guide apparatus used by a user while traveling.

When making preparations for travel or a tour, it is usual to buy a plurality of tour guidebooks, destination maps, and a collection of conversations in the local language (in case of an overseas tour) and the like, and tour plans are made accordingly. Planning items are sightseeing places, shopping places, restaurants for dining, hotels for stay, and transportation among these destinations. This information is kept in a tour guidebook by writing memos, and folding down corners of particular pages of the guidebook containing key information. Recently, however, it has become popular to collect tour information through an electronic tour guidebook and the Internet.

At the travel destination, while carrying a host of tour guidebooks and maps, the traveler enjoys sightseeing tours, scenery, architecture, and food according to the tour plan made beforehand. Further, depending on the local circumstances, the traveler may visit places not listed in the tour plan and carry out a tour in a manner not originally planned. As a result, the tour plan is changed with reference to the tour guidebook, and other related items.

Nevertheless, a conventional tour entails the following problems. In making up a tour plan, it is necessary to purchase a plurality of tour guidebooks, maps, and other necessary items and compare them with one another, thus calling for considerable work. Moreover, at the destination, the traveler has to carry heavy guidebooks containing much information having no bearing on his/her interest, as well as bulky maps, making a tour of the destination while flipping through these materials.

In light of these circumstances, the present invention meets a need to provide an information processing apparatus which can help the traveler enhance the value of a tour.

SUMMARY OF THE INVENTION

A guide system according to the present invention for meeting such a need is a guide system for generating guide contents from site information, contents information and information on information sources attached to the site information. The system includes a terminal; a contents server connectable to the terminal by a network; and a portable device to be carried by the user. The terminal has information setting means for setting a combination of the information on information sources and the contents information, and information transmitting means for transmitting information specifying the set combination to the contents server. The contents server includes information receiving means for receiving the information transmitted by the information transmitting means, site information focusing means for narrowing down the site information using the received information, guide contents generating means for generating guide contents using the narrowed down site information, and guide contents output means for outputting the generated guide contents. The portable device has guide contents acquisition means for acquiring the output guide contents, and contents utilizing means for using the acquired guide contents.

Further, a contents server according to the present invention for accomplishing the above-mentioned need generates guide contents from site information, information on information sources, and contents information. The server includes information acquisition means for acquiring information specifying a combination of the information on information sources and the contents information; site information focusing means for narrowing down the site information using the acquired information; guide contents generating means for generating guide contents using the narrowed down site information; and guide contents output means for outputting the generated guide contents.

Still further, the site information may include site positional information, and the guide contents generating means may generate the guide contents using map data, the map data including positional information on a map for each site. The guide contents generating means may lay out and display the site information on the map by matching the site positional information to the positional information on the map.

Furthermore, the contents generation means may include user information acquisition means for acquiring user information created by the user, wherein the guide contents generating means generates the guide contents by relating the acquired user information with the site information.

Moreover, according to the present invention, there is provided a portable device which utilizes information on information sources, contents information, and site information including positional information specifying a position of a site. The device includes information acquisition means for acquiring information specifying a combination of the information on information sources and the contents information; focusing means for narrowing down the site information using the acquired information; matching means for matching the positional information included with the site information to positional information on a map for each site to produce a map/site match for each site; and display means for displaying the site information on the map using the narrowed down site information and the map/site match for each site. The display means may display the site information on the map using an icon corresponding to the site information. Further, the display means may display the site information corresponding to the icon.

Still further, it is possible to provide an information processing method for implementing the above-mentioned functions, an information processing system for implementing the above-mentioned functions, and a computer-readable storage medium recorded with an information processing program for implementing the above-mentioned functions.

BRIEF DESCRIPTION OF THE DRAWINGS

For a better understanding of the present invention as well as other objects and advantages thereof, reference is made to the following detailed description in conjunction with the accompanying drawings, wherein:

FIGS. 2A, 2B, 2C and 2D are diagrams schematically showing information stored in each database;

FIG. 8 is a diagram showing POI information;

FIG. 17 is a diagram showing an example of a customized screen;

FIG. 18 is a diagram showing an example of setting a route on a customized screen;

FIG. 21 is a diagram showing an example of a BBS (Bulletin Board System) inserted on a community server;

FIG. 24 is a diagram showing an example of a logical construction of POI information;

FIG. 25 is a diagram showing an example of a selection page for selecting information providers;

DETAILED DESCRIPTION

Figure 1:
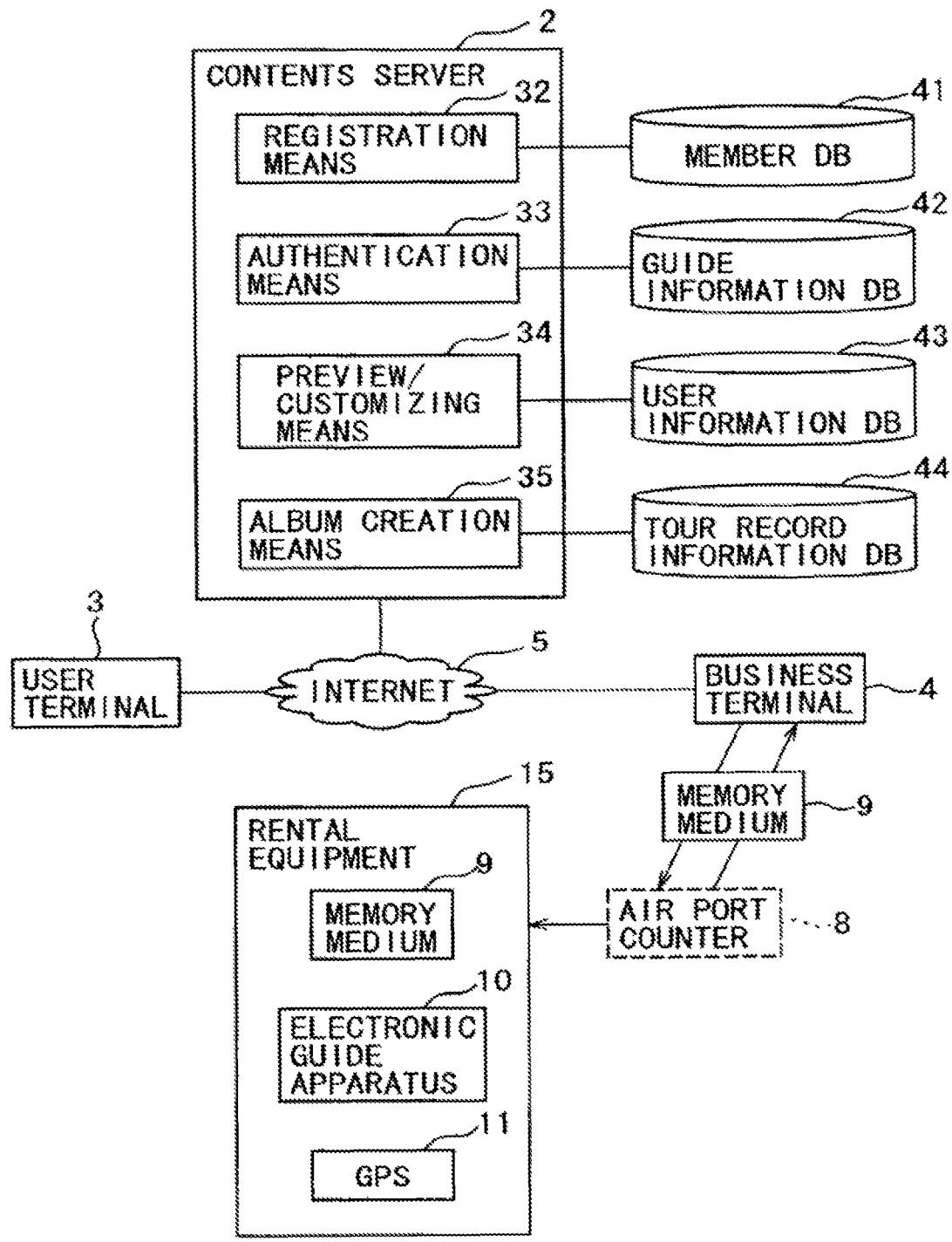
FIG. 1 is a conceptual diagram showing the configuration of a tour guide system according to a first preferred embodiment of the present invention.

Embodiments according to the present invention will now be described in detail below by referring to the accompanying drawings. A tour guide system of the present preferred embodiment in FIG. 1 can provide various beneficial services to a traveler (hereinafter referred to as the user) before, during, and after a tour.

Before Tour

From a user terminal 3, the user can customize and preview on a contents server 2 tour guide contents installed on an electronic guide apparatus 10 to be carried to a travel destination. The tour guide contents are generated using guide information and user information. The guide information includes, for example, information and programs prepared by the tour guide dealer based on local map data, such as POI (Place Of Interest) information (site information) for places of interest (sites connected with places as mentioned in sightseeing information and restaurant information). User information is information prepared by the user, such as memo information, favorite registrations, and route setting. It is information added to the guide information by the user.

Tour guide information is prepared for each travel destination, such as Hawaii and Rome. In addition, it is classified according to the user's taste, such as a basic course, gourmet course, and golf course. The user can select whatever he/she likes from these. As user information corresponding to the POI information of a restaurant, for example, the user can jot down the memo information "Lunch Here!". In this way, by selecting tour guide information and creating user information, the user can customize the tour guide contents for his/her own use.

When previewing the tour guide contents, there is displayed on the user terminal 3 the same preview screen as displayed on the electronic guide apparatus 10, while it is also possible to carry out the same operations performed on the electronic guide apparatus 10 artificially with respect to the displayed tour guide contents, thereby enabling the user to practice the tour guide contents operations on the electronic guide apparatus 10 through the user terminal 3 by previewing the tour guide contents on the user terminal 3.

The customized tour guide contents are downloaded by the contents server 2 to a business terminal 4 of a tour guide dealer (vendor of tour guide contents) and stored in a memory medium 9. The memory medium 9 includes a memory card, such as a semiconductor memory device, which is mounted to the electronic guide apparatus 10. The tour guide dealer forwards the memory medium 9 which stores the tour guide contents to an airport counter 8.

At the airport counter 8, the counter clerk attaches the memory medium 9 to the electronic guide apparatus 10, and rents it to the user together with a GPS 11. This provides the user with a rental of the electronic guide apparatus 10 and the tour guide contents stored in the memory medium 9. The user can use the tour guide contents customized by the user by carrying the electronic guide apparatus 10 at the destination.

A display unit to present the contents to the user, various keys to input character information, and a digital still camera for taking in image information are built in the electronic guide apparatus 10. Further, the electronic guide apparatus 10 and the GPS 11 are capable of radio communication, and the electronic guide apparatus 10 can receive positional information on the current position (measured positional information in latitude and longitude, and height may be included) from the GPS 11.

During Tour

During the tour the user moves around while carrying the electronic guide apparatus 10 (with the memory medium 9 already attached) and the GPS 11 at the travel destination. The user can make use of the tour guide contents on the electronic guide apparatus 10, acquiring tour support information such as a local map, POI information, memo information, current site display, and display of a best route to the destination. The current location is displayed in terms of positional information transmitted from the GPS 11.

Attached to each site on the map is its positional information, while the POI information has the positional information of the site attached thereto. Hence, the electronic guide apparatus 10 can lay out and display the POI information on the map by matching it with the positional information. For example, it is possible to display the site of a certain restaurant on the map with an icon showing the POI information thereof. Further, selecting this icon makes it possible to display detailed information on the restaurant.

Still further, the electronic guide apparatus 10 receives the user's positional information via radio at a preset time interval (for example, 0.1 sec.), and this is stored in the memory medium 9 as the user's action history, together with the receiving time. By plotting this on the map, it is possible to know a route (track) followed by the user during the tour. Furthermore, the user can jot down in the electronic guide apparatus 10 memo information during the tour, such as "A good steak in this restaurant!", as well as a tour diary. Data input by the user during the tour is stored in the memory medium 9 as tour record information.

Moreover, when an object is shot by a digital camera built in the electronic guide apparatus 10, the shooting time is recorded in terms of the day, hour, minute, and second (in addition to year) together with picture image data. The picture image data is also stored in the memory medium 9 as tour record information. By matching this shooting time information to the time data contained in the above-mentioned action history, the shooting site of the picture image data taken by the digital camera can be identified.

The information added by the user during the tour, such as picture image data and tour memo information, is stored in the memory medium 9 as tour record information.

After Tour

Upon arrival at the airport, the user returns all rental equipment (the electronic guide apparatus 10 and the GPS 11) to the airport counter 8. This means that the tour guide contents on rental to the user are also returned. The counter clerk removes the memory medium 9 from the electronic guide apparatus 10 and ships it to the tour guide dealer.

Upon receiving the memory medium 9 from the airport counter 8, the tour guide dealer extracts the tour record information and uploads it to the contents server 2. The action history is also included in this tour record information.

The contents server 2, using the received tour record information, creates a web page called "Album of Memories." On this album page are laid out pictures taken by the user at the shooting sites on the map of the area in which the user traveled. Further, the memo information during the tour may be affixed onto the map. By browsing the album pages through the user terminal 3, the user can look back on the tour.

Embodiments according to the present invention will be described below. A case of supporting the user during an overseas tour is provided as an example, but the present invention is not limited to this case. It may be configured to guide the user, be it a domestic tour, an overseas tour of a foreigner, appreciation of an event, watching or viewing, or visiting.

First Preferred Embodiment

FIG. 1 is a conceptual diagram showing the configuration of a tour guide system according to a first preferred embodiment of the present invention. The tour guide system includes a user terminal 3, a contents server 2, a business terminal 4, and rental equipment (a memory medium 9, an electronic guide apparatus 10, and a GPS 11).

The user terminal 3 and the business terminal 4, by using, for example, a predetermined protocol such as TCP/IP (Transmission Control Protocol/Internet Protocol), are able to communicate with the contents server 2 via the Internet.

The contents server 2 comprises registration means 32 for registering the user, authentication means 33 for authenticating the user, preview/customizing means 34 for previewing and customizing the tour guide contents, and album creation means 35 for creating an album of memories. The contents server 2 is managed by the tour guide dealer, and is designed to enable the tour guide dealer to read and manage all information stored therein.

The registration means 32 is means for registering the user as a person using the tour guide system. Because the contents server 2 provides the tour guide contents customized per user, the tour guide contents need to be managed per user. Consequently, the contents server 2 provides services to pre-registered users.

When the user makes a new registration, the contents server 2 transmits to the user terminal 3 a personal information input page for inputting a name and other personal information and a rental information page for inputting the tour guide contents as well as the departure date and time to be used. The registration means 32 receives from the user terminal 3 the user information (additional user information) input by the user into these pages and stores it in a member database 41, thus enabling the user registration to be executed.

FIG. 2A is a schematic diagram of an example of the user information stored in the member database 41. The user information essentially comprises a user ID, a password, personal information and rental information.

The user ID is what the registration means 32 gives uniquely to each user. Since the user ID is presented to the user at the user terminal 3, the user keeps a record of it. The password is what is set by the user to log-in the contents server 2. Thereafter, each user is able to be authenticated by the user ID and password.

The personal information is composed of information such as a user's name, an e-mail address, a telephone number, an address, sex, date of birth, a credit card type and number, and a limit of amount covered by the credit card. On the other hand, the rental information includes information such as a guide information ID, a departure date, a return date and a flight name and number.

The guide information ID is information to specify the guide information selected from among a variety of guide information made available. As will be explained below, the guide information is prepared per destination, and depending on the content, it is further divided into courses and stored in a guide information database 42. At the time of becoming a member, the user can select guide information using the rental information input page. The guide information ID is attached to the guide information selected by the user. Further, the selected guide information can be changed later.

FIG. 2B is a schematic diagram of an example of the data composition stored in the guide information database 42. The guide information is divided into destinations such as Hawaii and Rome, and is stored. Each destination is further divided into segments such as General Course, Golf Course, Shopping Course, and Gourmet Course. Each segment is assigned a single guide information ID.

By selecting the guide information matching the user's destination and taste, the user can customize the guide information for his/her own use. Conventionally, information that has no bearing on the user is carried with the tour guidebook, but, in the present embodiment, necessary information may be selectively customized for the user.

The guide information essentially comprises a variety of information to support a user's tour, such as commentary information (information on a target facility, place, and the like), picture image data information (maps, photos and the like), basic local information (information on the destination, weather near the target facility and the place, a transportation guide, and how to make a call in the case of overseas destinations), language information (information on the language used at the destination, conversation examples, a dictionary and the like), information on sights, and the POI information (site information on hotels, restaurants, shops and the like).

These items of the guide information are made into a database in terms of text, picture image data (still pictures, animated pictures, maps and the like), map data, and POI format. Of these items of guide information, information regarding the position is added with positional information in latitude and longitude, so that it can be made to correspond to data having other positional information.

For example, positional information is added to each site on the map, and also positional information on the site is provided to the POI information. Consequently, by matching positional information of a map to the positional information of the POI, the POI information of the POI can be laid out on the POI site on the map. The POI information can be laid out, for example, by using an icon made to correspond to the POI information.

Returning to FIG. 1, authentication means 33 is means to authenticate the user that gains access from the user terminal 3. The authentication means 33 executes authentication by comparing the user ID and password input by the user into a login page with the user ID and password registered in the member database 41. Further, the authentication means 33 confirms the user's login when the user is authenticated, and when the user is not authenticated, the user's login is rejected.

Preview/customizing means 34 is a functional unit for providing the function of previewing the tour guide contents and the function of customizing the tour guide contents. The preview/customizing means 34 transmits a preview page or a customized page to the user terminal 3 as selected by the user. Using these pages, the user can preview or customize his/her own tour guide contents. In this way, the preview/customizing means 34 constitutes contents generation means.

First, the customizing function will be described. On the customized page, the user can write memo information with respect to the POI, register important POI information as a favorite, or preset a tour route. The preview/customizing means 34 stores this information set by the user in the user information database 43 as user information.

FIG. 2C is a schematic diagram of an example of the user information stored in the user information database 43. Each of the user information is so laid out that it can be searched with the user ID of the user who created it as a key.

The user information is composed of information input and set by the user, such as memo information, registered favorite information, and route setting information. The memo information is what is written with respect to a specific POI, such as "This shop is a must to see!" and, for example, information gathered by the user, word-of-mouth information, information obtained from his/her friends and the like are added in the memo format.

Although not illustrated, information matching the memo information to the POI information is stored either in the memo information or the POI information, or in a matching information database which collects such matching information. By using the matching information, when the POI information is displayed on the electronic guide apparatus 10, it is possible to display the memo information matching the POI together with the POI information.

Further, the memo information is not limited to text data, and picture image data such as a photo also can be input as memo information. Furthermore, the memo information can be constructed so that information not related to any specific POI, such as "This day is a national holiday", can be jotted down.

Registered favorite information is important pieces of the POI information which are registered as favorites. As will be explained later, the POI information registered as a favorite is shown on the screen, for example, with a favorite registered mark that appears as if the tip of a top corner of a page is folded to make it identifiable from other POI information, and only the POI information registered as a favorite can be displayed there. Further, the registered favorite information can be so set up that it is not to be stored in the user information database 43 as user information, but rather to be directly written into the POI information within the guide information.

Route setting information is information of a plurality of routes from a departure site to a destination site preset on a map. Presetting the route in this way will make it unnecessary to search the best route upon arrival at the site, so the user can start a tour there without delay. Furthermore, when traveling in a group, for example, if a tour schedule for the group is set, the schedule of group action can be shared with the electronic guide apparatus 10 of each group member.

The preview/customizing means 34, in addition to offering a function for the user to customize the tour guide contents as mentioned above, has a contents creation function for creating and transmitting the tour guide contents to the business terminal 4 using the guide information selected by the user and the user information set by the user.

To be more specific, the preview/customizing means 34 searches the guide information selected by the user as well as the user information set by the user, with the user ID as a key, by means of the guide information database 42 and the user information database 43, and the results obtained are integrated into one unit of the tour guide contents to generate tour guide contents for the use of the user. The tour guide contents generated by the preview/customizing means 34 are written into the memory medium 9 through the business terminal 4.

Figure 3:
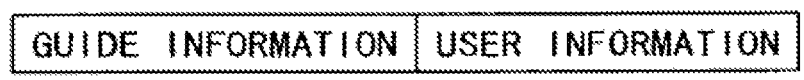
FIG. 3 is a diagram conceptually showing a construction of tour guide contents.

FIG. 3 is a conceptual diagram of the composition of the tour guide contents. As illustrated, the tour guide contents are composed by integrating the guide information and the user information into one unit of contents. Note that, although not illustrated, control software to be used for matching the guide information to the user information is included in the tour guide contents.

Next, a preview function will be described. Use of the preview function makes it possible to make a simulated use, on the user terminal 3, of the tour guide contents which the user customized in the same manner as the tour guide contents is used by operating the electronic guide apparatus 10 at the destination. When the user transmits from the user terminal 3, for example, a command (information to be used) to flip a page, a program for using the tour guide contents on the contents server 2 side (program to be used) is executed, a result thereof being transmitted to the user terminal 3. In this manner, the user can practice, prior to starting a tour, how to use the tour guide contents for his/her use.

The preview/customizing means 34 stores an operating history of the user utilizing the preview/customizing means 34 as a log file per user. Further, the preview/customizing means 34, when the user requests a preview page or customized page, refers to the log file, generates a preview page or a customized page in the latest condition for use of the user, and transmits it to the user terminal 3.

In this manner, because the preview/customizing means 34 is designed to generate a web page per user, each user virtually has a web page exclusively for his/her use on the contents server 2, whereby, for example, after the user suspends editing work and logs out, should the user again log in to the contents server 2, it is possible to continue customizing or previewing from where the work was suspended.

Album creation means 35 (FIG. 1) acquires tour record information from the business terminal 4 and stores it in the tour record information database 44. Then, when there is an album page transmission request from the user terminal 3, the tour record information stored therein is used to generate the album page which is transmitted to the user terminal 3.

The album page is a web page where a photo taken by the user is affixed on a shooting site on the map of a user's tour area or memo information during the tour, such as "Good coffee served here!", is affixed on a coffee shop position on the map, or the user's track is illustrated with a map. The album creation means 35 consists essentially of picture image data acquisition means, map data acquisition means, shooting position specifying means for specifying a shooting position of a picture image on the map, and layout means to lay out a picture image on the map.

FIG. 2D is a schematic diagram showing an example of the tour record information stored in the tour record information database 44. The tour record information is segmented by the user ID per user. As illustrated, the tour record information includes action history, picture image data, and memo information during a period of the tour. It is the information accumulated in the memory medium 9 during the period of the tour.

Among this plurality of information, the memo information during the tour is memo information jotted down by the user with respect to the POI during the tour, and as the tour record information, it may be so composed that in addition to this, a tour diary and the like may be generated.

The album creation means 35 (FIG. 1) specifies a site where picture image data is shot by matching a shooting time attached to the picture image data to the time information included in the action history. The album creation means 35 arranges the corresponding picture image data on the map on the shooting site.

Further, by the album creation means 35, the user may be able to edit the album page, such as by adding a picture image or writing text on the map.

As will be explained later, in the present preferred embodiment, the tour guide contents are composed of the guide information and the user information as separate files, so that the guide information can be updated to incorporate the latest information without changing the user information. Namely, if management by the contents server 2 is carried out so that the guide information becomes the latest information, downloading of the tour guide contents from the business terminal 4 to the memory medium 9 makes it possible to download the latest guide information. Further, even after downloading the tour guide contents to the memory medium 9, it is possible to change only the guide information without changing the user information.

Also, a composition such as combining plural kinds of guide information, for example, using the gourmet course and the golf course as guide information, can be performed. Moreover, it may be so composed that the POI information is individually selected to customize the guide information.

Further, it may be so composed that the guide information can be edited, for example, as follows. Namely, as the guide information, a plurality of information sources (information generated based on a tour guidebook by publisher A, information generated based on a tour guidebook by publisher B and the like) may be available and the information sources are selected per item (publisher A's information for restaurants, publisher B's information for hotels and the like).

Still further, in the present preferred embodiment, as an example, the registration means 32, the authentication means 33, the preview/customizing means 34, and the album creation means 35 are constituted within one contents server 2. However, it is not limited to this example. For instance, a combination of a plurality of server units may be used to constitute a tour guide system as follows. Namely, the registration means 32 and the authentication means 33 may be realized by an authentication server, while the preview/customizing means 34 may be realized by a contents generation server. Furthermore, the system can be so constituted that browsing of the web by means of the user terminal 3 can be arranged to be performed from the web server, wherein the web server and the contents server 2 are connected so as to mutually update the information.

The user terminal 3 (FIG. 1) may comprise, for example, a terminal unit such as a personal computer capable of connecting to the Internet 5. Only one user terminal 3 is shown in the drawing, but any arbitrary number of terminals may be set up.

The user terminal 3 is provided with a browser, hence, each page transmitted from the contents server 2 (a personal information input page, a rental information input page, a customizing page, a preview page and the like) may be shown on the display by the browser. Further, the data (the personal information, the rental information and the like) input from each page by the user through the browser may also be transmitted to the contents server 2 from the user terminal 3.

Each page transmitted by the contents server 2 to the user terminal 3 is described by a prescribed markup language, for example, HTML (Hyper Text Markup Language) or XML (eXtensible Markup Language). The browser interprets a file described by any of these languages and shows a web page on the display.

The business terminal 4 is a terminal unit having write means to write the tour guide contents customized by the user on the memory medium 9 and tour record information extracting means for extracting the tour record information from the memory medium 9 after the tour and transmitting it to the contents server 2. The configuration of the business terminal 4 is basically the same as the user terminal 3, and comprises a terminal unit such as a personal computer capable of connecting to the Internet 5.

When downloading the tour guide contents, the user ID of the user who customized the tour guide contents is transmitted from the business terminal 4 to the contents server 2. Then, in the contents server 2, the preview/customizing means 34 generates customized tour guide contents for the user and transmits them to the business terminal 4. Such tour guide contents are written by the business terminal 4 into the memory medium 9 and rented to the user in the form of the memory medium 9 attached to the electronic guide apparatus 10 at the airport counter 8. Further, for rental service providing places, in addition to the airport counter of a tour agent, counters of transportation companies and credit card companies can be used. Furthermore, home delivery services may be used to ship directly to the user, or counters of tour agents in town and convenience shops may also be used.

The memory medium 9 is a memory card packed with a semiconductor memory device therein, and, for example, may be a Memory Stick (registered trademark). This semiconductor memory device is a nonvolatile read/write semiconductor memory, requiring no power source to hold a memory content. As a result, it can be made small in the shape of a chip. The memory medium 9 is frequently used for holding programs or data on a desktop PC, a notebook PC, a PDA, a digital camera, a video camera and the like.

It should be noted that the memory medium 9 is not limited to a semiconductor memory device. Any read/write memory medium may be employed, such as a hard disk, a magneto-optical disk, an optical disk, a flexible magnetic disk, and a magnetic tape.

The airport counter 8 is a window for renting the rental equipment 15 to and collecting it from the user. For example, it may be set up in a merchandise sales space of a tour agent in a tie-in with a tour guide dealer. At the airport counter 8, the rental equipment 15 is rented to the user. Further, when renting the electronic guide apparatus 10 to the user, the electronic guide apparatus 10 should be tied to the memory medium 9 with a string. This makes it possible to maintain a sales method in which the ownership right of the contents is held by the tour guide dealer, while the ownership right of the electronic guide apparatus 10 is held by the tour agent.

The rental equipment 15 essentially comprises the electronic guide apparatus 10 mounted with the memory medium 9 and the GPS 11. The electronic guide apparatus 10 is a small electronic device, such as a PDA, which the user can carry at the destination, and while being carried, it is driven by a battery cell mounted therein.

A PDA is a computer made small enough to be held by one hand so as to manage personal information or execute prescribed information processing. The PDA generally has a PIM (Personal Information Manager) function, such as electronic schedule management, electronic address management, electronic memo notebook, and action list management.

In addition to the PIM function, the electronic guide apparatus 10, details of which will be explained later, has a browser to show the tour guide contents on its display unit, a GPS signal receiving function, a built-in camera (digital camera) and the like.

Further, the electronic guide apparatus 10 has a slot for installing and ejecting the memory medium 9, and mounts the memory medium 9 as a constituting element of the electronic guide apparatus 10 by inserting the memory medium 9 in the slot.

Further, the electronic guide apparatus 10 can provide to the user each function offered by the tour guide contents stored in the memory medium 9 (a map display, a guide information display, a best route search, a current position display, a display of a conversation example, a memo information display and the like), while at the same time storing in the memory medium 9 the user's action history as well as the tour record information, such as picture image data taken by the user with the built-in camera and memo information input by the user during the tour from the electronic guide apparatus 10.

Further, the electronic guide apparatus 10, being equipped with an antenna for radio communications, can conduct radio communications with the GPS 11. The electronic guide apparatus 10 receives positional information on the current position from the GPS 11 at a prescribed time interval and stores it in the memory medium 9, together with the current time, as the action history.

In the present preferred embodiment, the electronic guide apparatus 10 is configured as a separate unit from the GPS 11, whereas these two units may be configured as one integral unit. It should be noted that configuring the electronic guide apparatus 10 separately from the GPS 11 gives longer battery life to the electronic guide apparatus 10 and the GPS 11.

The GPS 11 is a device for receiving GPS signals from a GPS satellite and calculating from the received GPS signals information on the current position and the current time. As used herein, the GPS (Global Positioning System) refers to a global position measuring system. It is a system of analyzing signals transmitted from a plurality of artificial satellites circling around a trajectory at a height of 20,000 km and calculating the latitude and longitude, height, current time and the like of the current position. Further, the calculation of the current position by means of the GPS is performed using any of the following three methods: a calculation in terms of the autonomous GPS based only on information from the GPS satellites; a calculation in terms of the network-based GPS by acquiring positional information of a plurality of base stations on the ground; and a network-assisted calculation by respectively calculating distances from the GPS satellites and the positions from the base stations to enhance positional accuracy. The GPS 11 can be configured to handle all of these methods.

Action history essentially comprises positional information and time information. However, it may be so configured that both the positional information and the time information from the GPS are transmitted to the electronic guide apparatus 10, or that the GPS 11 transmits only the positional information, while the time information is provided by the electronic guide apparatus 10.

Figure 4:
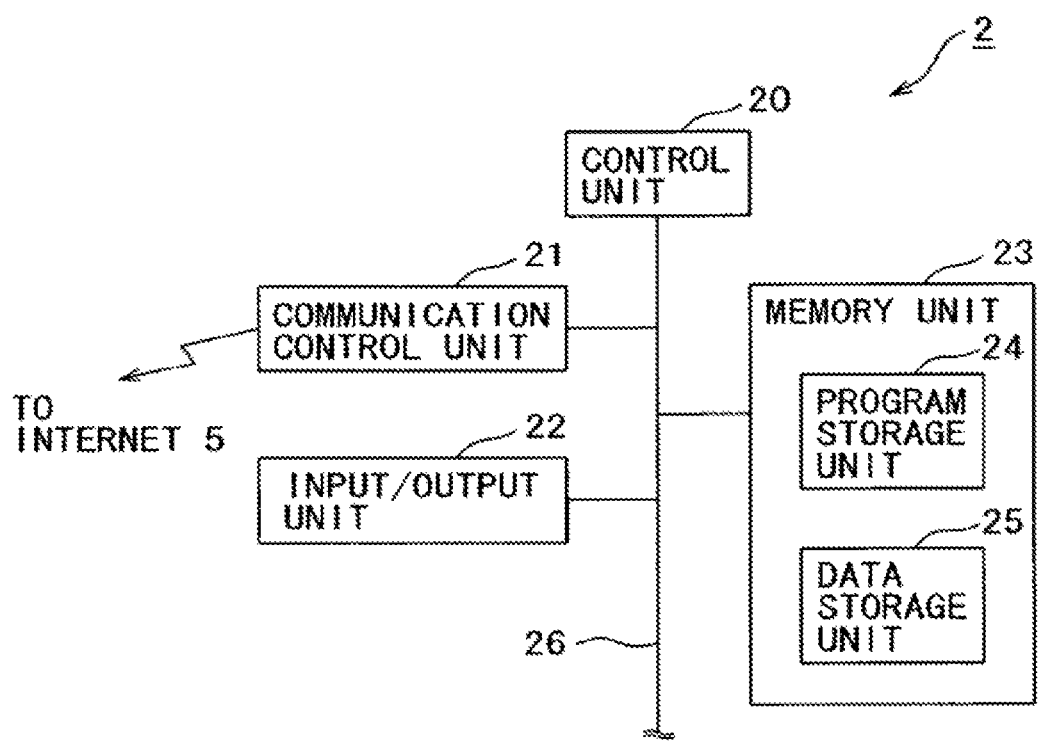
FIG. 4 is a diagram showing an example of a hardware-like configuration of a contents server.

FIG. 4 is a diagram showing an example of a hardware based configuration of the contents server 2. The contents server 2 comprises a control unit 20, a communication control unit 21, an input/output unit 22, a memory unit 23, and a bus line 26 mediating transmission and reception of signals and data among these functional units.

The control unit 20 is composed of a CPU (Central Processing Unit), a ROM (Read Only Memory), a RAM (Random Access Memory) and the like.

The CPU reads a program and executes various information processing according to procedures stipulated by the program. The ROM, being a read only memory medium, stores a basic program and parameters for operating the contents server 2.

The RAM, essentially comprising a plurality of memory devices provided with addresses, is a random access memory which, by designating an address, can read data to and write data from the address. The RAM provides a working area when the CPU executes a program. The control unit 20 having the above-mentioned configuration executes various information processing and control operations of the entire contents server 2.

The communication control unit 21 is a device such as a modem for connecting the contents server 2 to the Internet 5. The communication control unit 21 is controlled by the control unit 20, carrying out communication with terminal units such as the user terminal 3 and the business terminal 4. The communication control unit 21 represents input/output means for performing data input/output with the user terminal 3 and the business terminal 4. It is constituted by guide information transmitting means, additional user information receiving means, contents output means, information for use receiving means (commands from the user terminal 3 in preview) and the like.

The input/output unit 22 is composed of, for example, an output device, such as a display and a printer, and an input device, such as a keyboard and a mouse. These devices are used, for example, when a manager of the contents server 2 manages and maintains the contents server 2.

The memory unit 23 is, for example, a memory device constituted by a hard disk and the like which can perform a large amount of read/write operations. A program storage unit 24 and a data storage unit 25 are provided in the memory unit 23 in which various programs and data are stored.

In the program storage unit 24, there are stored a server program to make the contents server 2 fully perform a server function (to transmit a prescribed web page to the user terminal 3 and the business terminal 4 in response to web page transmission requests from these terminal devices), an OS (Operating System) which is a basic program for operating the contents server 2, such as memory control including a RAM and file input/output control, and a tour guide contents providing program to make the control unit 20 demonstrate its tour guide contents providing function.

By the execution of the tour guide contents providing program by the CPU of the control unit 20, each of the functional units shown in FIG. 1, such as the registration means 32, the authentication means 33, the preview/customizing means 34, and the album creation means 35, is constituted in a software based manner.

In the data storage unit 25, there are stored the member database 41, the guide information database 42, the user information database 43, the tour record information database 44 and other data.

Figure 5:
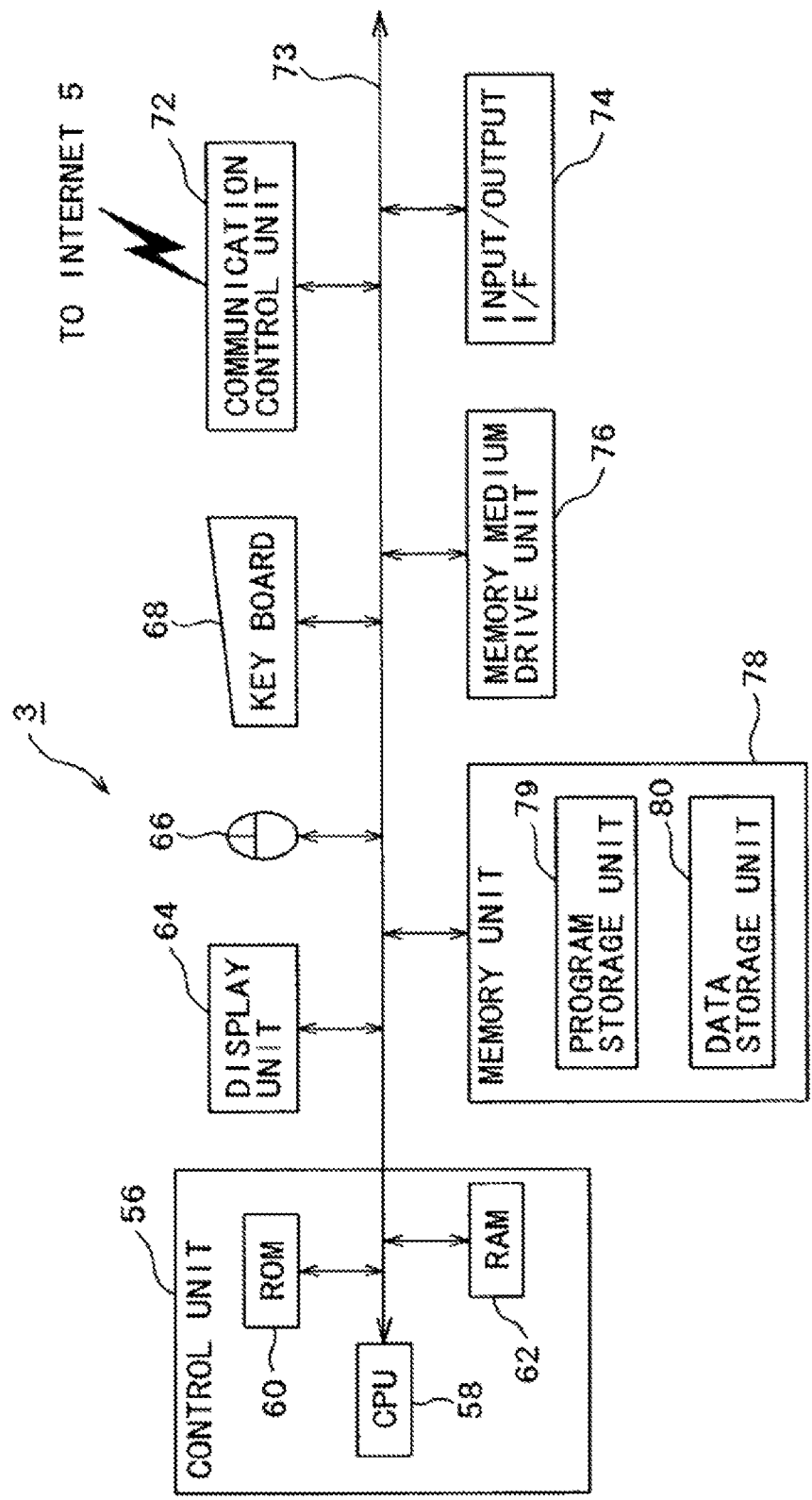
FIG. 5 is a diagram showing an example of a hardware-like configuration of a user terminal.

FIG. 5 is a diagram showing an example of a hardware based configuration of the user terminal 3. The user terminal 3 is configured by connecting peripheral equipment, such as a display unit 64, a mouse 66, a keyboard 68, a communication control unit 72, a memory unit 78, a memory medium drive unit 76, and a input/output interface (I/F) 74, to a control unit 56 via a bus line 73. The bus line 73 mediates control signals and data signals transmitted and received between the control unit 56 and the peripheral equipment.

The control unit 56 comprises a CPU 58, a ROM 60, a RAM 62 and the like. The control unit 56 is driven by a prescribed program, executes various information processing and controls the operation of the entire user terminal 3. In the present preferred embodiment, using a preview page and a customized page downloaded from the contents server 2, the control unit 56 demonstrates functions to preview and customize the tour guide contents and to read an album page.

The information processing function and the control function of the control unit 56 come into full play through the CPU 58. The CPU 58 has a memory unit called "register," which reads a program from the ROM 60 and the RAM 62 and executes it.

The ROM 60 is a read only memory storing various programs, data and parameters for the CPU 58 to perform various arithmetic operations and control. Although the CPU 58 can read programs, data, and parameters from the ROM 60, it does not rewrite or delete them.

The RAM 62 is a random access memory accessed by the CPU 58 as a working memory. The CPU 58 can write programs and data in the RAM 62 and delete them therefrom. In the present preferred embodiment, it is possible to secure an area in the RAM 62 in order to preview or customize the tour guide contents, or browse an album page.

The keyboard 68 essentially comprises keys to input Japanese kana and English letters, numeric keys to input numerals, various functional keys, a cursor key and other keys. From the keyboard, the user can, for example, input the user ID and password and write memo information on a customized page.

The mouse 66 is a pointing device. When operating the user terminal 3 using a GUI (Graphical User Interface), a pointer that moves accompanying the movement of the mouse is shown on the display unit 64. By moving the mouse on the desktop to match the pointer to any of the buttons or icons displayed on the display unit 64 and clicking the mouse button, various operations corresponding to these buttons and the icons can be performed.

The display unit 64 essentially comprises, for example, a CRT (Cathode Ray Tube) display, a liquid crystal display, a plasma display or the like. On the display unit 64, there may be displayed a preview page, a customized page, an album page or the like.

The communication control unit 72 is a device for connecting the user terminal 3 to the Internet 5, and comprises a modem, a terminal adaptor, and other connection equipment. The user terminal 3 can communicate with the contents server 2 by using the communication control unit 72. The communication control unit 72 comprises guide information receiving means, additional user information transmitting means and the like.

The memory unit 78 is composed of a read/write memory medium and a drive unit for read/write programs and data therefor. A hard disk is mainly used as the memory medium. In addition, it is possible to use other read/write memory media, such as a magneto-optical disk, a magnetic disk, or a semiconductor memory, to constitute the memory unit 78.

A program storage unit 79 and a data storage unit 80 are set up in the memory unit 78. Various programs for execution by the CPU 58 are stored in the program storage unit 79, and various data is stored in the data storage unit 80.

In the program storage unit 79, there are stored an OS which is a basic program for operating the user terminal 3, browser software for displaying a web page downloaded from the contents server 2, a communication control program to control communications with the contents server 2 by controlling the communication control unit 72 and the like.

The memory medium drive unit 76 is a drive device for performing a data read/write operation by driving a detachable memory medium. As the detachable memory medium, there are, for example, a magneto-optical disk, a magnetic disk, a magnetic tape, a semiconductor memory, a data-punched paper tape, a CD-ROM or the like. Note that the CD-ROM and the paper tape are capable of only a read operation.

The input/output interface (I/F) 74 comprises, for example, a serial interface and an interface of other specification. By connecting an external apparatus corresponding to the interface with the input/output interface 74, the function of the user terminal may be expanded.

The hardware configuration of the business terminal 4 is basically the same as the user terminal 3. The business terminal 4 has a memory medium drive unit capable of data read/write operations with respect to the memory medium 9, and the tour guide contents received from the contents server 2 can be written in the memory medium 9. In addition, the tour record information can be extracted from the memory medium 9 sent by the user after the tour, and transmitted to the contents server 2. Further, it is possible to read and input from the business terminal 4 necessary information, such as the personal information and the rental information.

Figure 6:
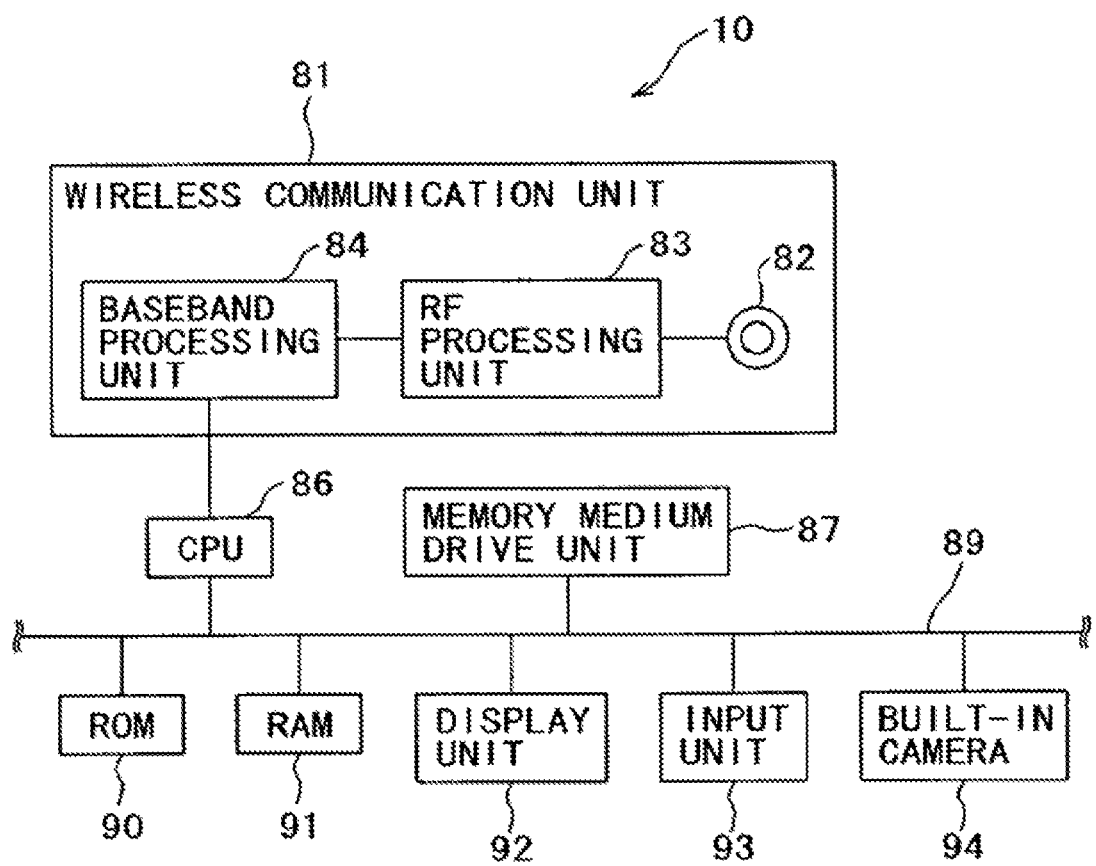
FIG. 6 is an example of a hardware configuration of an electronic guide apparatus.

FIG. 6 is a diagram showing an example of a hardware configuration of the electronic guide apparatus 10. The electronic guide apparatus 10 essentially comprises a CPU 86, a wireless communication unit 81, a ROM 90, a RAM 91, a display unit 92, a memory medium drive unit 87, an input unit 93, and a built-in camera 94, all connected by a bus line 89.

The wireless communication unit 81 comprises a baseband processing unit 84, an RF processing unit 83, and a wireless communication antenna 82, and receives positional information from the GPS 11. The wireless communication unit 81 employs wireless techniques based on local wireless functions.

Wireless techniques based on local wireless functions include, for example, wireless communication using a 2.4 GHz ISM (Industrial Scientific and Medical) band which is the same band used for wireless LAN (WLAN) in accordance with the IEEE802.11 standard, such as direct sequence spectrum (DSSS) wireless communication. Commonly known as Blue Tooth, it is generally suited for transmitting data to other devices within a distance of 10 m.

The electronic guide apparatus 10, when receiving the positional information from the GPS 11, transmits a request signal to the GPS 11 for requesting the positional information. The request signal is transmitted from the CPU 86 to the baseband processing unit 84, and is then subjected to signal processing. Thereafter, it is placed on a transmission wave at the RF processing unit 83 and sent via wireless from the antenna 82 to the GPS 11.

On the other hand, after positional information transmitted by wireless from the GPS 11 is received by the wireless communication antenna 82, a signal is extracted by the RF processing unit 83, further subjected to signal processing by the baseband processing unit 84, and conveyed to the CPU 86. It should be noted that the wireless communication unit 81 acquires the positional information from the GPS 11 at a prescribed time interval (for example, 0.1 sec.), and this is stored in the memory medium 9 as action history. The wireless communication antenna 82 essentially comprises measured position acquisition means and measured time acquisition means.

The CPU 86 performs various information processing and controls the electronic guide apparatus 10 according to a host of programs stored in the ROM 90 and other memory devices. The CPU constitutes control means for controlling the tour guide contents according to the control software. Further, the CPU 86 may constitute shooting position specifying means for specifying a shooting position of picture image data from the action history and shooting time of the picture image data.

The memory medium 9 is attached to the memory medium drive unit 87. This enables the CPU 86 to read/write data with respect to the memory medium 9. To be more specific, the CPU 86 can read the tour guide contents stored in the memory medium 9 and drive the control program included in the tour guide contents and, further, write the tour record information (action history, picture image data, memo information during the tour and the like) in the memory medium 9. The memory medium 9 essentially comprises position time storage means, picture image data storage means and the like.

The ROM 90 stores a program for operating the electronic guide apparatus 10. For this kind of program, there are available programs such as an OS for demonstrating basic functions, a browser to show the tour guide contents, a built-in camera control program for controlling the built-in camera 94, a communication program for controlling radio communication with the GPS 11, and a Japanese kana/Chinese character conversion program for converting letters input by the user into Chinese characters.

It should be noted that in the present preferred embodiment, the control software (utilization program) for using the tour guide contents is included in the tour guide contents, however, this control software may be made available in the ROM 90 in advance. In this case, it becomes unnecessary to include the control software in the tour guide contents. Further, other possible constitution methods include storing the control software in the RAM 91 or attaching a hard disk to the memory medium drive unit 87 to enable the control software to be stored therein.

The RAM 91 provides a working area for the CPU 86 to operate. For example, when driving the control software of the tour guide contents, receiving the positional information from the GPS 11, or taking a picture of an object with the built-in camera 94, the CPU 86 utilizes the RAM 91 for temporarily holding data.

The display unit 92, being, for example, display means constituted by a liquid crystal display (LCD), displays screens provided by the tour guide contents. The contents to be displayed include picture images, photographs, guide information and user information in characters or images. Further, the display unit 92 may have an input unit comprising a touch panel. The user, by touching elements displayed thereon by a touch pen or a fingertip, can input prescribed information into the electronic guide apparatus 10.

The input unit 93 is a functional unit which enables the user to input information into the electronic guide apparatus 10, for example, including a key operation unit. From the key operation unit, the user can input numerals and characters.

The built-in camera 94 is a digital camera composed of a shutter, a lens, a CCD, a focus control unit and the like. The focus control unit is a functional unit measuring a distance to an object, adjusting a lens position, and automatically adjusting focus. The CCD is a device for converting an image of the object through the lens into electric signals. In addition, iris setting is automatically performed. The built-in camera 94 comprises shooting means and shooting time acquisition means.

When the user presses the shutter, an image on the CCD is converted to electric signals, whereby the CPU 86 generates picture image data and stores the data in the memory medium 9. The electronic guide apparatus 10 has a clock built therein, and the shooting time is added to the picture image data in terms of day, hour, minute, and second. The data on this shooting time is used later when creating an album page. Further, the picture image data may be so constructed that the data, in addition to being directly stored in the memory medium 9, may be stored in the RAM 91 for subsequent batch processing to be performed for storage in the memory medium 9.

Figure 7:
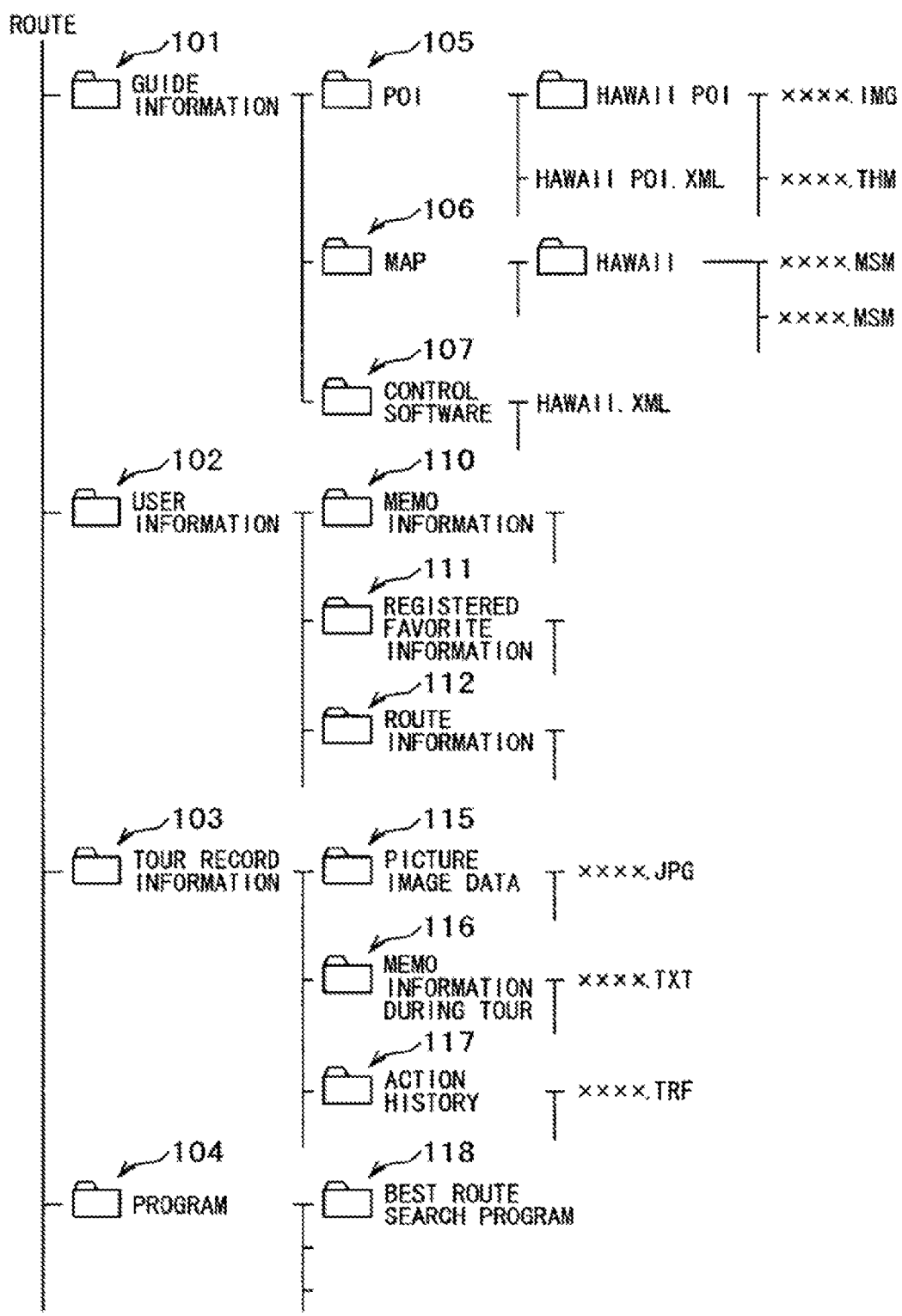
FIG. 7 is an example of a file construction of tour guidebook contents stored in a memory medium.

FIG. 7 is a diagram showing an example of a file composition of the tour guide contents stored in the memory medium 9. Under the layer of route directory are generated directories such as guide information directory 101, user information directory 102, tour record information directory 103, and program directory 104.

Then, under the guide information directory 101 are further generated directories such as POI directory 105, map directory 106, and control software directory 107. The POI information, such as restaurant information and hotel information, is stored in the POI directory 105.

Map data regarding the destination is stored in the map directory 106. In the present preferred embodiment, the map data is prepared in raster graphics. It is also possible to constitute the map data in vector graphics.

Control software for controlling contents to be displayed on the display unit 92 of the electronic guide apparatus 10 is stored in the control software directory 107. In this control software, the CPU 86 gives full play to a function to correspond certain information to one another, for example, by linking the POI information stored in the POI directory 105 and the map data stored in the map directory 106 to the user information stored in the user information directory 102.

The CPU 86, using the control software, can display these items of information on the display unit 92 by means of a GUI. Further, through the control software, it is possible to change the display contents according to the user's input, such as displaying POI information and memo information.

In this manner, according to the present preferred embodiment, it is possible to manage the guide information as separate files according to the content, such as POI information, map data and the like. Consequently, it is possible to update, for example, only the kind of POI information whose contents frequently change while keeping unchanged map data subject to comparatively little change.

Under the user information directory 102 there are further generated directories such as memo information directory 110, registered favorite information directory 111, and route information directory 112. The memo information created by the user is stored in the memo information directory 110. If the memo information is connected to the guide information, the memo information includes information specifying the connected guide information.

For the connected guide information, for example, there is POI information. By attaching information specifying the POI information of the connected party to the memo information, when the POI information is displayed, the memo information created for the POI can be displayed. Or, conversely, if information is attached specifying memo information connected to the POI information or a database storing a relationship of connection between the POI information and the memo information is made available, the same effect can be achieved.

In the registered favorite information directory 111, there is stored information to specify the POI information registered as a favorite and the like. Note that the registered favorite information may not be controlled by the registered favorite information directory 111, but by giving an identifier directly to the registered favorite POI information and controlling it thereby. In the route information directory 112, there is stored data to display on the map a travel route preset by the user.

Under the tour record information directory 103 there are further generated directories such as picture image data directory 115, memo information during tour directory 116, and action history directory 117. In the picture image data directory 115, there is stored picture image data taken by the built-in camera 94. The picture image data is stored in a prescribed format, such as JPEG (Joint Photographic Experts Group). The system may be so formed that not only still pictures but moving pictures can be taken by the built-in camera 94.

In the memo information during tour directory 116, there is stored memo information during the tour input by the user while traveling. In the action history directory 117, there is stored positional information received from the GPS 11, together with the receiving time. By means of the action history directory 117, where the user was and when can be determined so as to specify the user's track during the tour.

In the program directory 104, there are stored application programs such as a best route search program 118 to be used by the electronic guide apparatus 10. The best route search program 118 is a program which, when the user sets the destination, calculates the best route to the destination from the current position (as acquired from positional information of the GPS 11) and displays the calculated route on the map.

It should be pointed out that data connected to the position in which the memory medium 9 is stored (map data, POI information, memo information, action history and the like) is registered in a standard position informational format, so that in addition to relating a plurality of contents with map data, positional information can be shared among a plurality of apparatus which can use the memory medium 9. As a result, it is possible to provide a service, for example, of mediating positional information across the boundaries of a plurality of apparatus, such as affixing picture image data taken by the built-in camera 94 onto the map of a computer.

When using a Memory Stick as the memory medium 9, because GLORIE (Global Site-related Information Exchange File Format) is defined as a site-related information exchange format, data exchanges can be simply performed by registering in this format.

Use of the common format facilitates the exchanging of data with other apparatus by using an external recording medium such as the memory medium 9. For example, when consulting with one's friend in advance about a tour, use of data in the common format makes it possible to see the POI information in a way that fits one's own equipment by exchanging information through the memory medium 9, even despite having apparatus of mutually different types. Further, this can be reflected on the map.

FIG. 8 is a diagram showing a specific example describing the POI information. In this drawing, the POI information is generated as an example using XML. In FIG. 8, inside a tag indicating the POI information, a latitude(<lat>) tag and a longitude (<lon>) tag are described surrounding a position (<pos>) tag. Further, the Statute of King Kamehameha is described in a name (<name>) tag, and commentary information is described in an information (<information>) tag.

Furthermore, a link file (<linkfile>) tag is added to the POI information, in which a link to the user information is specified with <text herf=" . . . /memo.txt"></text>. Consequently, it is possible to display, for example, the user information "strongly recommended!" recorded in a text file memo .txt created by the user. In this example, information to specify memo information is written in the POI information.

Note that the invention is not limited to describing POI information in XML. Other computer languages may be used for description, such as HTML (Hypertext Markup Language).

Figure 9:
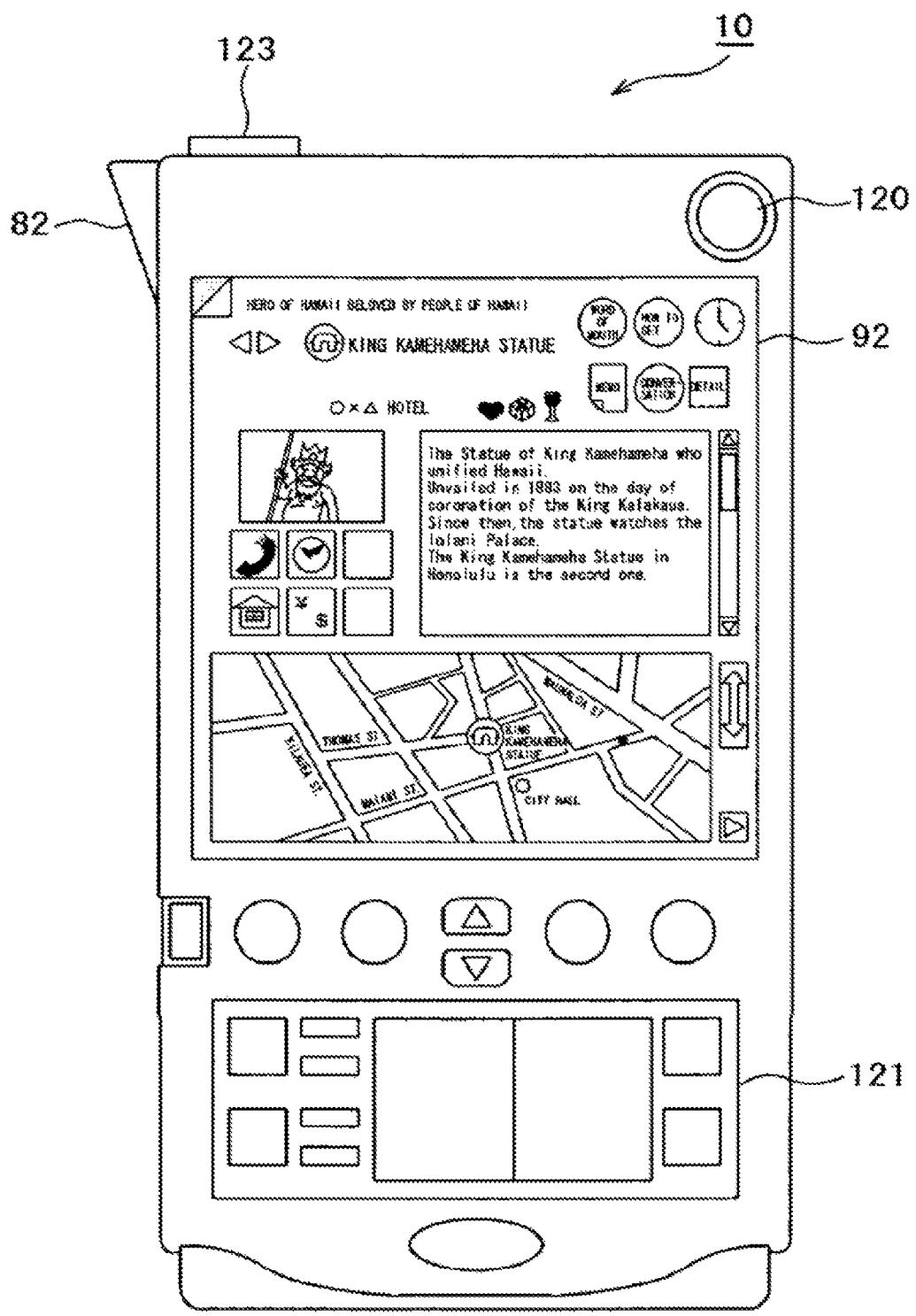
FIG. 9 is an example showing the external appearance of an electronic guide apparatus.

FIG. 9 is a diagram showing an example of the external appearance of the electronic guide apparatus 10. The electronic guide apparatus 10 includes the display unit 92, a key operation unit 121, a lens 120, a shutter control 123, and the wireless communication antenna 82.

The display unit 92 can display a guide screen provided by the tour guide contents. In addition to showing display contents relating the guide information with the user information, a function such as showing the current position on the map can be performed on the guide screen. Further, the display unit 92 is formed of a touch panel to enable the user to change the display content by tapping an icon on the screen.

The key operation unit 121 is equipped with various keys including numeral/character keys, a space key, and function buttons to enable the user to input various information, such as character information and commands to execute programs, from the key operation unit 121.

The lens 120 is for capturing an object to be taken by the built-in camera 94. When the user presses down the shutter control 123, an image captured by the lens 120 is stored in the memory medium 9 as picture image data. In the drawing, the lens 120 and the display unit 92 are disposed on the same plane, but it may be so arranged that the lens 120 is disposed on the opposite side of the electronic guide apparatus 10 so as to display an image captured by the lens 120 real-time on the display unit 92. Such construction enables the user to press down the shutter control 123 while confirming the image captured by the lens 120 with the display unit 92.

Figure 10:
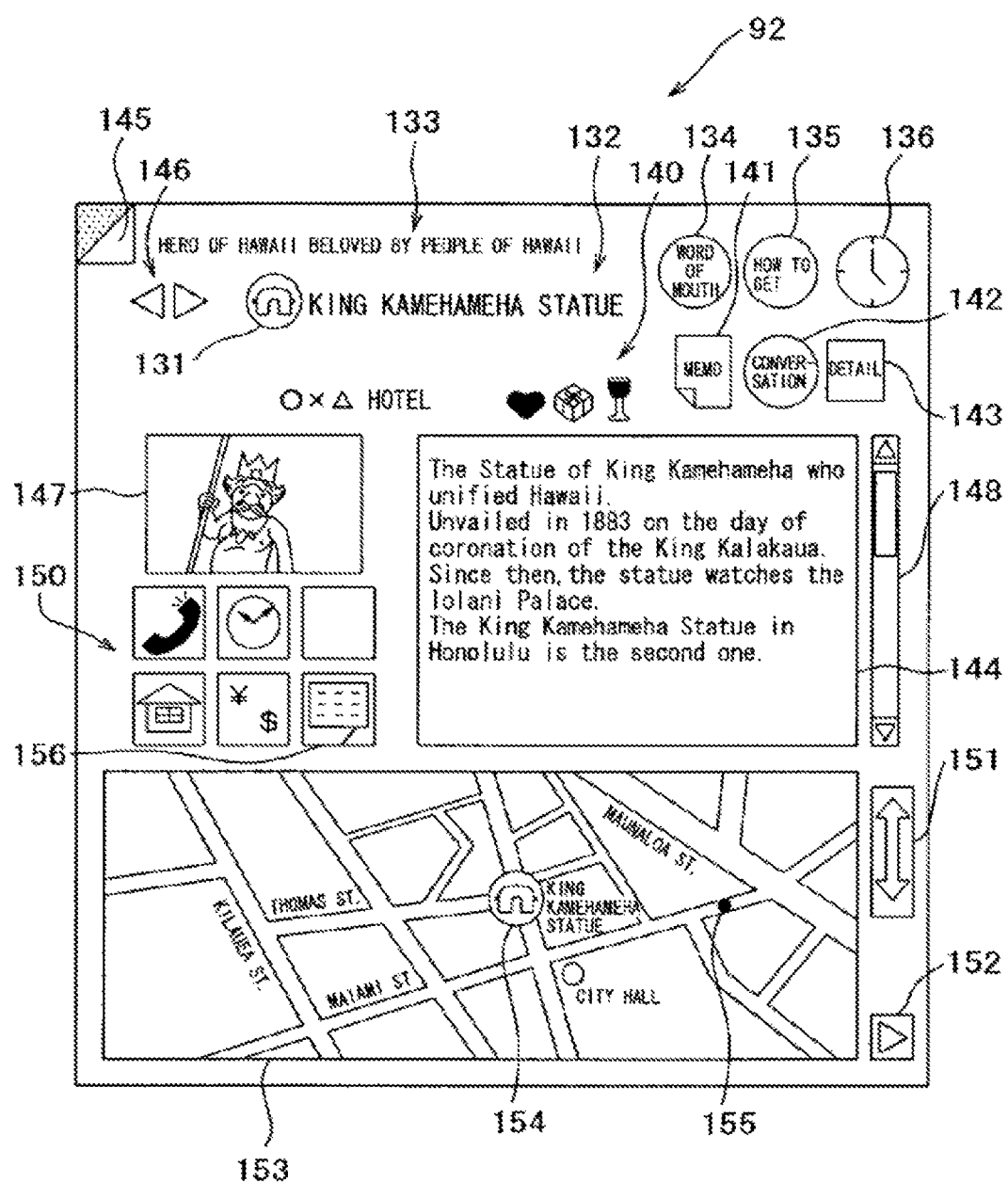
FIG. 10 is an example of a guide screen.

FIG. 10 is an enlarged diagram showing an example of a guide screen displayed on the display unit 92 of the electronic guide apparatus. The user can use the tour guide contents from the guide screen. The diagram relates to a case in which the King Kamehameha Statue is selected for the POI. A POI name 132 indicates the name of the POI selected. In the drawing, the name is shown in English, but it may be shown in a plurality of languages such as "English name/local language name."

A subtitle 133 indicates a subtitle. A favorite mark 145, when tapped, performs a toggle operation and registers the POI information as a favorite. Those registered as a favorite by the user terminal 3 are in default. By performing the prescribed operation, the user can show only the POI information registered as favorites.

A major classification category of hotels, restaurants, and shops are represented by an icon which is shown in a category icon 131. When a page forward/backward button 146 is tapped, the displayed POI information can be turned to the next page POI information or returned to the previous page. When a word-of-mouth button 134 is tapped, word-of-mouth information is displayed. The word-of-mouth information is, for example, an electronic presentation of local information conveyed by word of mouth from those who traveled to the destination.

When a how-to-get button 135 is tapped, information on how to get to the destination is displayed. Also, the best route of getting to the destination may be searched. This is made possible as the icon (icon showing POI such as restaurants) on the destination of the map is tapped, the CPU 86 calculates the best route from the current position (acquired from data through the GPS 11) to the destination and displays it on the map.

In this manner, the electronic guide apparatus 10 can provide a so-called man-navigation function such as a vehicle navigation system. The man-navigation function refers to a technique of displaying the best route that enables a pedestrian to walk to where pedestrians can go.

For an algorithm calculating the best route from the current position to the destination, an algorithm used for a vehicle navigational system is available. The man-navigation system can navigate the pedestrian to a site where cars cannot go but to which pedestrians can walk, for example, a site in a landmark, a building in a theme park, or a restaurant in a shopping mall, or a site such as an outlet inside a store.

Further, the man-navigation system can navigate a route that cars cannot pass but pedestrians can, such as in a park, seacoast, a pedestrian overpass, a station shopping complex, an underground road, and going against a one-way street. Furthermore, it is possible to navigate avoiding a highway, a vehicle road, a dangerous zone having problems in public safety and the like.

It should be pointed out that the vehicle navigation system has the POI for vehicles, such as service stations and family restaurants along a trunk road, while the electronic guide apparatus 10 has the POI mainly for pedestrians.

When a clock button 136 is tapped, a clock screen pops up, concurrently displaying local time and Japan time, for example. An alarm can be set so that when the prescribed time is reached, the alarm goes off. When the alarm is set, an icon of the clock button 136 changes its shape.

A symbol button 140 uses an icon to show "for family," "for couples" and the like or to express an evaluation. When a memo button 141 is tapped, a memo screen pops up, and it becomes possible to input memo information during the tour in connection with the POI currently selected. Also, a memo input prior to the tour can be read out. When a conversation example button 142 is tapped, a conversation screen pops up, and an example of conversation related to the POI information, such as how to order food in the local language, is displayed in a local language bearing a Japanese subtitle to show how to read it in Japanese.

When a detail button 143 is tapped, there pops up a detail display screen showing detailed information (commentary of a museum, a map and the like) on the POI information currently displayed. When a photo 147 is tapped, the photo is shown in an enlarged format. When there are a plurality of photos, the displayed photo is changed every few seconds. Further, it is possible to set up to show a list of thumbnail photos so that the user can select a photo therefrom which is to be shown in an enlarged format. In an information area 150, there are available various buttons for displaying information related to POI, such as business hours, regular days off, address, and ads. For example, when an ad button 156 is tapped, an advertising page regarding the POI information currently displayed pops up.

In a commentary field 144 there is displayed commentary on the POI information. When the commentary field 144 is tapped, commentary is displayed over the entire section below the POI name 132. When there are many characters, scrolling can be applied by tapping a scroll bar 148.

A map is shown on a map window 153. When the user is in an area within the map displayed, a user's current position 155 obtained from the GPS 11 is also displayed. Further, it is possible to add information showing a traveling direction in which the user is going or walking to the current position 155. Still further, at the POI position currently displayed on the map, an icon 154 is displayed. This is shown by matching the positional information held by the POI information to the positional information held by each site on the map. Furthermore, it is possible by the user's choice to position at the center of the map window 153 either the current position 155 or the icon 154 in the POI position currently being displayed.

The icon on the POI is displayed, for example, in a form which makes it possible to identify a category in which the POI is classified, such as hotels, stores, and restaurants.

When a zoom button 151 is tapped, the scale of the map displayed in the map window 153 can be changed. When a POI screen/map screen changeover button 152 is tapped, it is possible to change the POI screen shown in the figure to a map screen displaying a map over the entire screen.

Further, it is possible to display a route (track) of the user's movement in the map window 153. This is obtained by plotting positional information included in action history over the map. As a result, the user can find out the route he/she followed.

Furthermore, a picture image taken by the user can be laid out in the map window 153. Since the shooting time is attached to data of the picture image taken by the user, by matching this shooting time to the time information contained in the action history, the site at which the picture image was shot can be identified. Moreover, the system can be so constituted that after the user lays out a thumbnail of the picture image taken on the map, if the user taps the thumbnail, the captured picture image will pop up.

Figure 11:
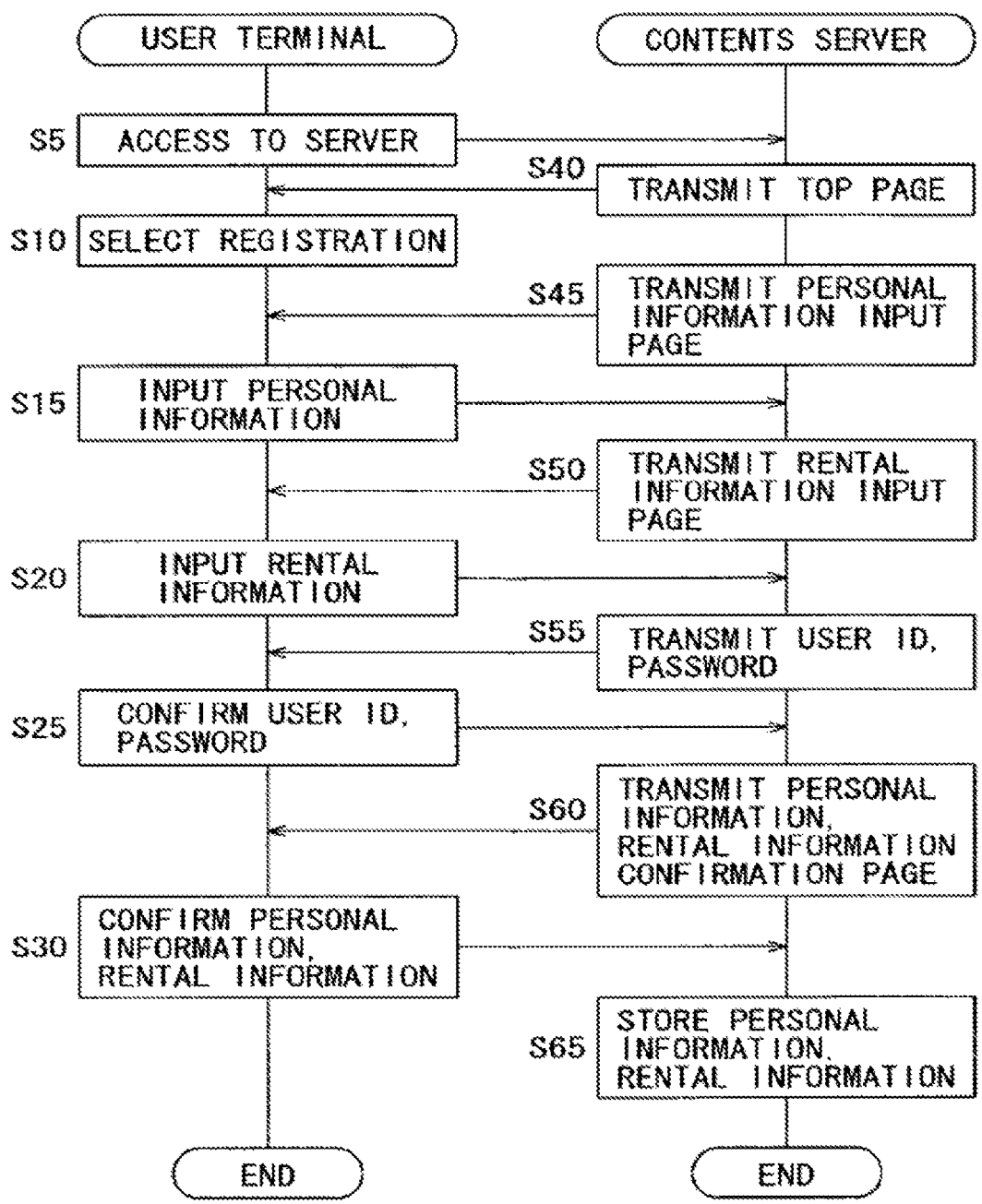
FIG. 11 is a flowchart explaining a registration process in a contents server.

FIG. 11 is a flowchart to explain the procedure by which the user registers on the contents server 2 from the user terminal 3. Operation of the user terminal 3 is performed by the CPU 58 in the control unit 56 in FIG. 5, and operation of the contents server 2 is performed by the CPU thereof.

First, at the user terminal 3, the user inputs the URL (Uniform Resource Locator) of the contents server 2 on the browser and gains access to the contents server 2 (step S5). In response to this, the contents server 2 transmits a top page to the user terminal 3 (step S40).

The top page is arranged so that new registration or login can be selected, and in the present case, new registration is selected (step S10). Then, a signal indicating the selection of new registration is transmitted from the user terminal 3 to the contents server 2. The contents server 2, upon receiving this signal, transmits a personal information input page to the user terminal 3 (step S45).

Specified items (personal information, such as name and e-mail address) and the password set by the user are entered into the personal information input page displayed at the user terminal 3. By clicking the transmission button displayed on the page, the personal information input by the user is transmitted to the contents server 2 (step S15).

The contents server 2, upon receiving the personal information from the user terminal 3, temporarily stores it in the RAM or the like, then transmits a rental information input page to the user terminal 3 (step S50). The user inputs the rental information specified by the rental information input page displayed by the user terminal 3, and transmits it to the contents server 2 (step S20).

The contents server 2 receives the rental information from the user terminal 3 and temporarily stores it in the RAM or the like. Next, the contents server 2 issues a user ID to the user and transmits it to the user terminal 3.

Then, the contents server 2 transmits a confirmation page to the user terminal 3 to confirm the issued user ID and password (step S55). The user confirms the user ID and password at the user terminal 3 and keeps a copy of them. After confirmation, the user transmits a signal indicating the user's confirmation of the user ID and password to the contents server 2 by clicking a confirmation completion button shown on the page (step S25).

The contents server 2, upon receiving this signal, transmits a personal information and rental information confirmation page to the user terminal 3 (step S60). The user reads out the personal information and rental information confirmation page and confirms the personal information and the rental information. After confirmation, the user transmits a signal indicating the user's confirmation of the personal information and rental information to the contents server 2 by clicking the confirmation completion button shown on the page (step S30).

The contents server 2, upon receiving this signal, stores the personal information and rental information stored in the RAM or the like in the member database 41 (step S65). The above-mentioned procedures complete new registration processing.

Figure 12:
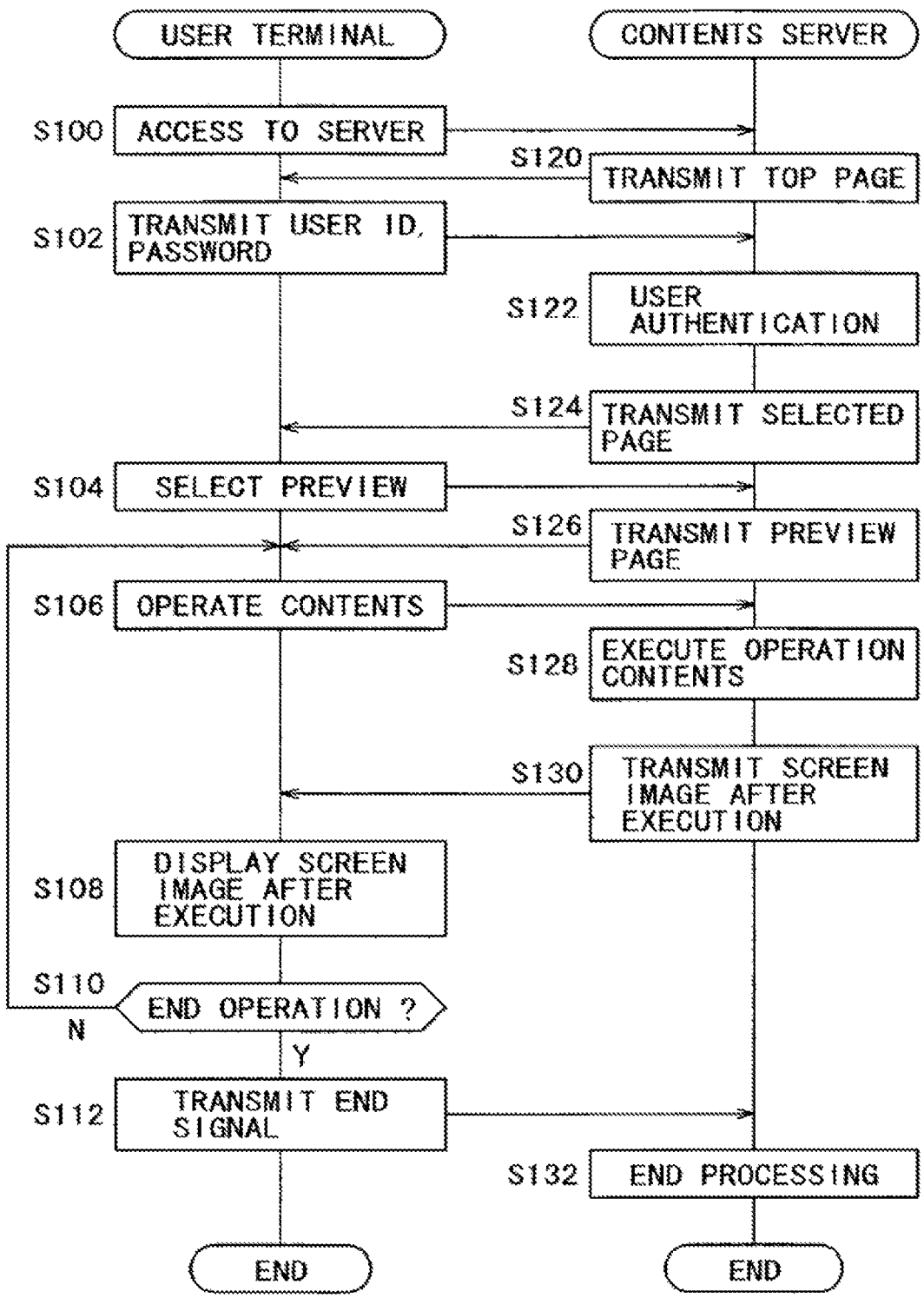
FIG. 12 is a flowchart explaining a process of previewing the tour guide contents.

FIG. 12 is a flowchart to explain the procedure of previewing the tour guide contents. It is assumed that the user's membership registration has already been completed. Now, access is gained to the contents server 2 from the user terminal 3(step S100). In response, the contents server 2 transmits a top page to the user terminal 3 (step S120).

The user selects login on the top page displayed by the user terminal 3, inputs his/her user ID and password into prescribed columns, and transmits them to the contents server 2 (step S102). The contents server 2 receives the user ID and password from the user terminal 3, and authenticates the user using this data (step S122).

The contents server 2, upon completing authentication of the user, transmits a selected page to the user terminal 3 (step S124). The selected page is so designed that either a preview or customizing of the tour guide contents can be selected. The user terminal 3 receives the selected page from the contents server 2 and displays it on the display unit 64.

When the user selects preview on the selection screen, the user terminal 3 transmits a selection signal indicating selection of preview to the contents server 2 (step S104). The contents server 2 receives the selection signal indicating selection of preview and transmits a preview page to the user terminal 3 (step S126).

The user terminal 3 receives the preview page from the contents server 2 and displays it on the display unit 64. On the preview page there is displayed a guide screen of the tour guide contents in the same condition as displayed on the electronic guide apparatus 10 (condition of FIG. 10).

The user is able to operate the tour guide contents through the guide screen of the user terminal 3 by simulating the operation of the electronic guide apparatus 10. In that regard, rather than tapping an icon on the electronic guide apparatus 10, the user actuates the icon on the guide screen by clicking on it with a mouse. The guide screen changes in the same manner whether operated from the user terminal 3 or from the electronic guide apparatus 10. Namely, the operation of the tour guide contents at the electronic guide apparatus 10 may be practiced beforehand at the user terminal 3.

First, when operating the tour guide contents on the guide screen by clicking an icon, the user terminal 3 transmits a signal indicating the operation contents to the contents server 2 (step S106). The contents server 2 receives a signal indicating the operation contents and performs processing to execute the operation contents (step S128). The contents server 2 then generates a guide screen (a screen after execution of the operation contents) displaying the result of execution processing and transmits it to the user terminal 3 (step S130).

The user terminal 3 receives the guide screen after execution of the operation contents and displays it on the display unit 64 (step S108). Through this screen, the user finds out how the guide screen changes (transitions) by his/her operation.

If operation of the tour guide contents is not completed (step S110; N), processing is returned to step S106 and operation of the tour guide contents is continued. If operation of the tour guide contents is to be ended (step S110; Y), an end button on the preview page is clicked. Then, the user terminal 3 transmits an end signal to the contents server 2 indicating the end of the preview (step S112). The contents server 2 receives this end signal and ends the preview (step S132).

In the above-mentioned examples, the tour guide contents are operated by the contents server 2. In addition, it may be so arranged that the tour guide contents are transmitted to the user terminal 3, and the user terminal 3 thus operates the tour guide contents.

Figure 13:
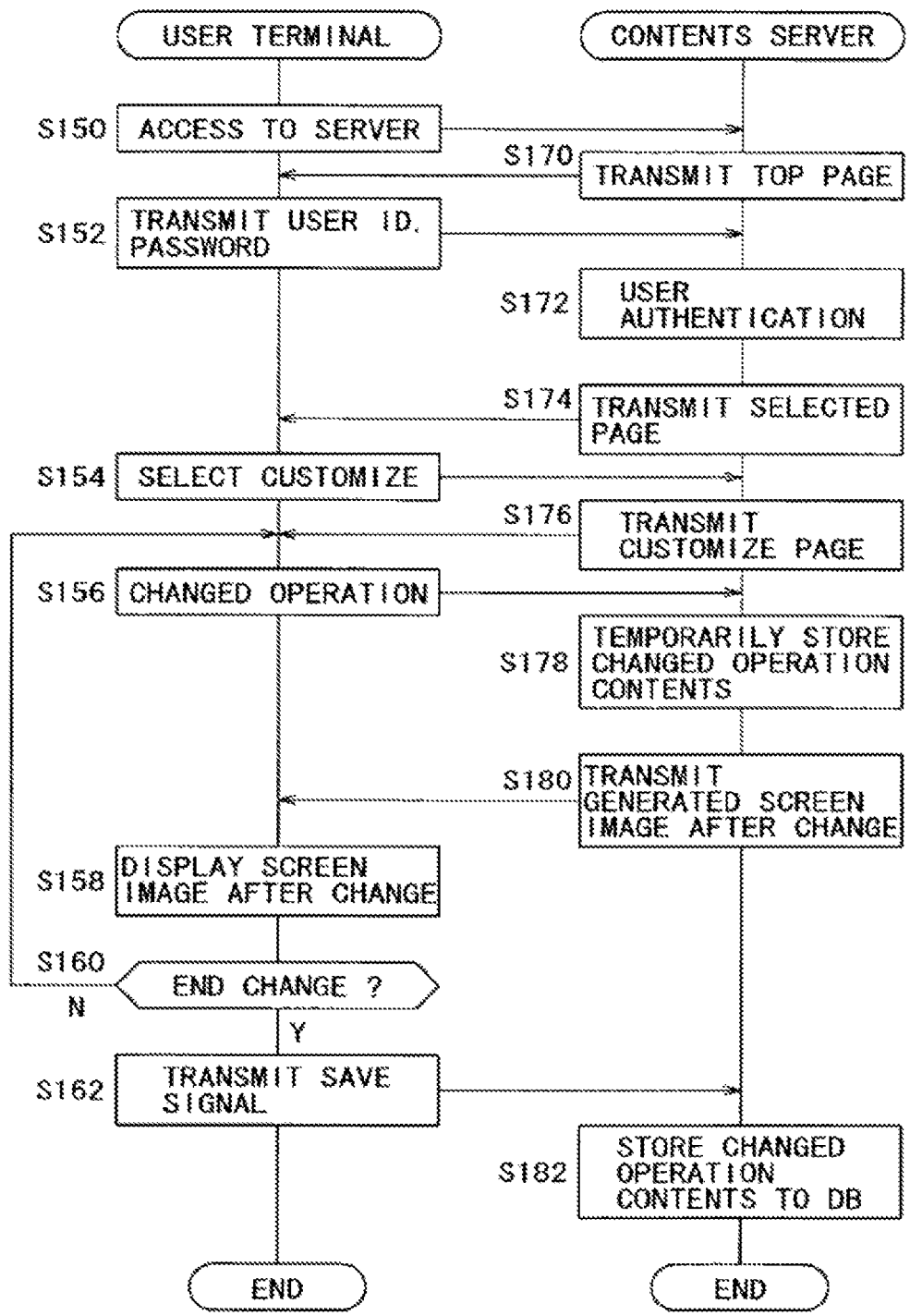
FIG. 13 is a flowchart explaining a process of customizing the tour guide contents.

FIG. 13 is a flowchart to explain the procedure of customizing tour guide contents. It is assumed that the user's membership registration has already been made. Now, access is gained to the contents server 2 from the user terminal 3 (step S150). In response to this, the contents server 2 transmits a top page to the user terminal 3 (step S170).

The user selects login on the top page displayed by the user terminal 3, inputs his/her user ID and password into prescribed columns, and transmits them to the contents server 2 (step S152). The contents server 2 receives the user ID and password from the user terminal 3, and authenticates the user using this data (step S172).

The contents server 2, upon completing authentication of the user, transmits a selected page to the user terminal 3 (step S174). The selected page is so designed that either preview or customizing of the tour guide contents can be selected. The user terminal 3 receives the selected page from the contents server 2 and displays it on the display unit 64.

When the user selects customizing on the selection screen, the user terminal 3 transmits a selection signal indicating the selection of customizing to the contents server 2 (step S154). The contents server 2 receives the selection signal indicating the selection of customizing and transmits a customizing page to the user terminal 3 (step S176).

The user terminal 3 receives the customizing page from the contents server 2 and displays it on the display unit 64. On the customizing page there is displayed a guide screen of the tour guide contents, and the user performs operations thereon, such as writing memo information, making a favorite registration, and setting a route.

On the customized page, the user performs operations, such as writing memo information, and when the tour guide contents are changed, the user terminal 3 transmits a signal indicating the contents of the changed operation to the contents server 2 (step S156). This signal contains the contents of the added memo information as well.

The contents server 2 receives a signal indicating the contents of this changed operation and temporarily stores them in the RAM or the like (step S178). The contents server 2 then generates a screen displaying the changed contents and transmits it to the user terminal 3 (step S180).

The user terminal 3 receives an after-change screen and displays it on the display unit 64 (step S158). If the change operation is not to be ended (step S160; N), processing is returned to step S156 and the operation for changing is continued. If the change operation is to be ended (step S160; Y), a save button shown on the customizing page is clicked.

Then, the user terminal 3 transmits a save signal to indicate confirmation of the changed contents to the contents server 2 (step S162). The contents server 2, upon receiving the save signal, confirms the changed operation contents temporarily stored in the RAM or the like, customizes the tour guide contents for the use of the user, stores the contents in the prescribed database (step S182), and ends the processing. Namely, these operations include storing memo information input by the user, a favorite registration and the like in the user information database 43, and in the event of the user information being connected to the guide information, storing the information regarding the connection.

Figure 14:
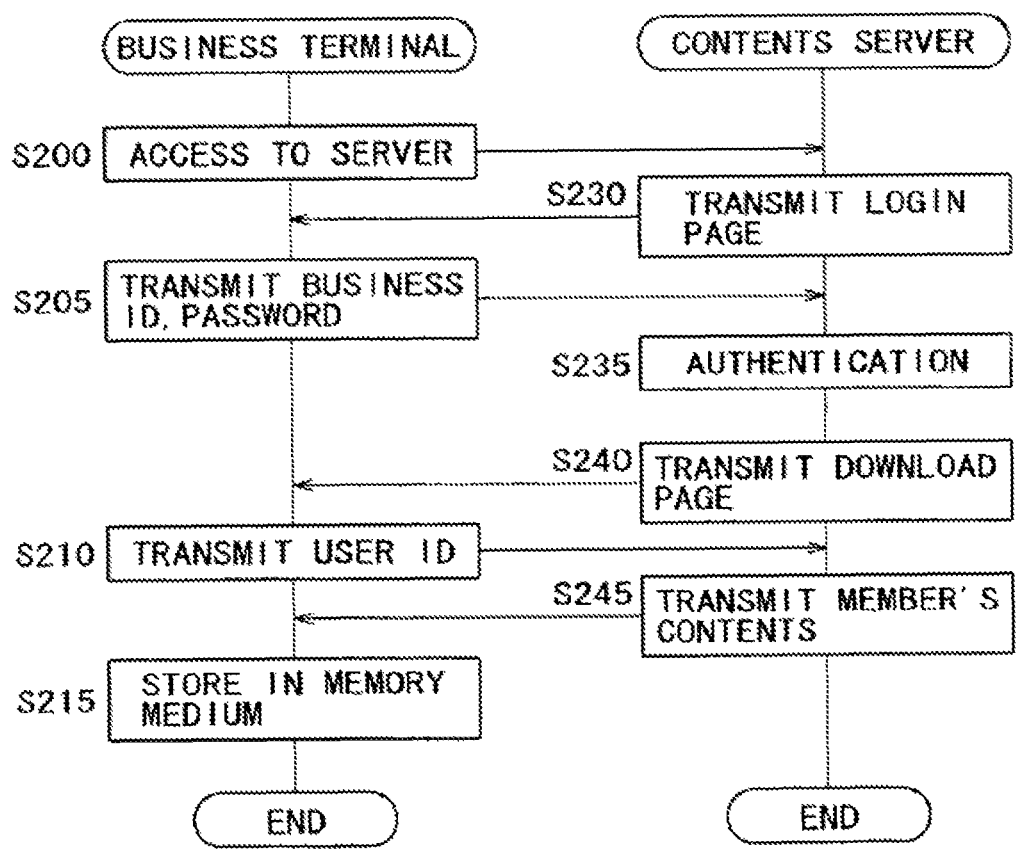
FIG. 14 is a flowchart explaining a process of downloading the tour guide contents.

FIG. 14 is a flowchart to explain the procedure of downloading the tour guide contents from the contents server 2. The operations mentioned below are performed by the CPU of the contents server 2 and the CPU of the business terminal 4. First, the tour guide dealer, by inputting the prescribed URL in the browser, gains access to the contents server 2 from the business terminal 4 (step S200).

On the other hand, the contents server 2 transmits a login page to the business terminal 4 for use by the tour guide dealer (step S230). The tour guide dealer inputs the dealer's ID and password on the login page displayed on the business terminal 4 and transmits them to the contents server 2 (step S205). The contents server 2 receives the dealer's ID and password and authenticates the tour guide dealer (step S235).

Upon completing authentication of the tour guide dealer, the contents server 2 transmits a downloaded page to the business terminal 4 (step S240). Next, the tour guide dealer inputs the user ID of a specific user into the downloaded page displayed on the business terminal 4 and transmits the user ID to the contents server 2 (step S210).

The contents server 2 receives the user ID from the business terminal 4, searches the guide information selected by the user and the user information created by the user in the guide information database 41 and the user information database 43, creates the tour guide contents for use by the user, and transmits the contents to the business terminal 4 (step S245).

The tour guide dealer stores the tour guide contents downloaded from the contents server 2 in the memory medium 9 (step S215) and completes download processing of the tour guide contents.

Figure 15:
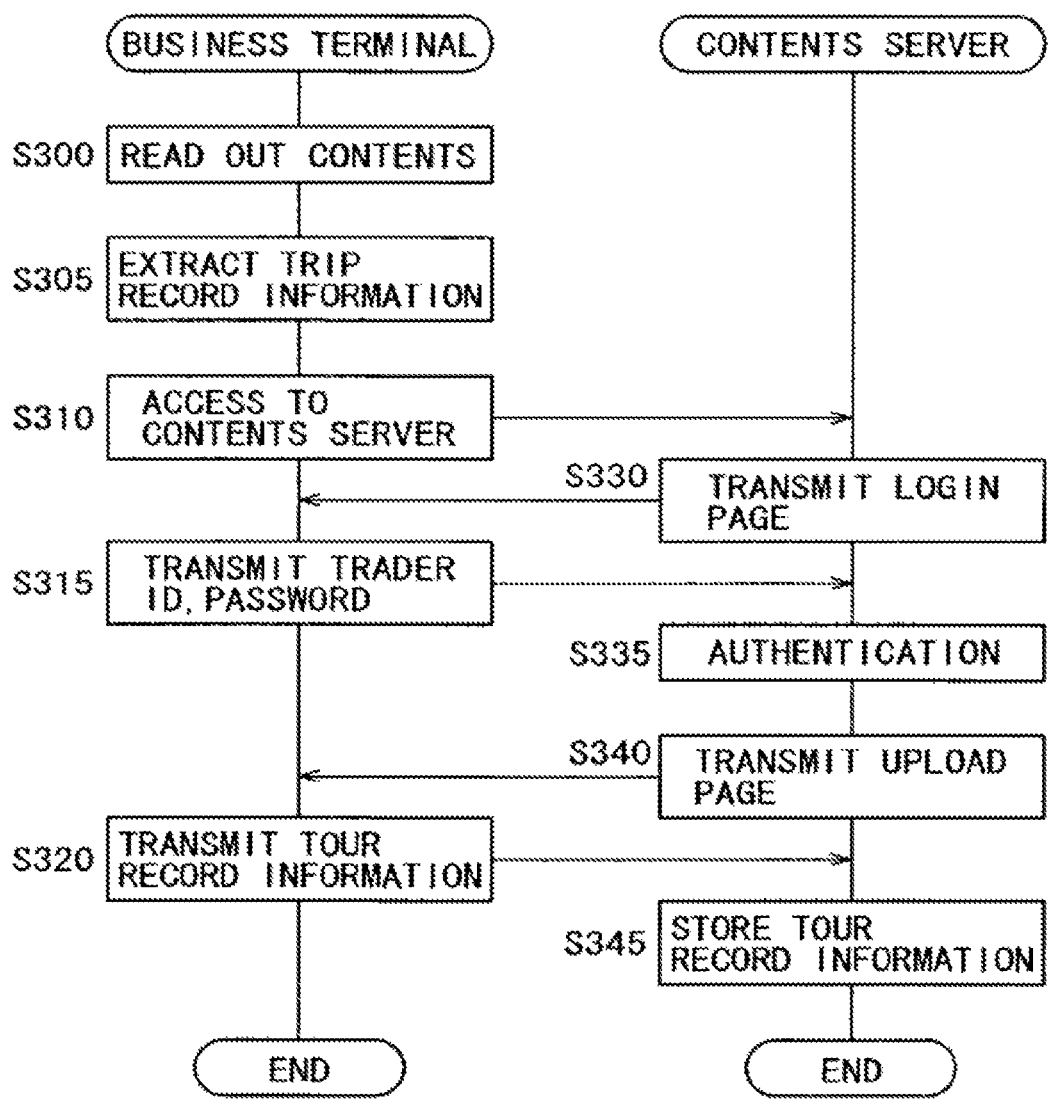
FIG. 15 is a flowchart explaining a process of uploading tour record information.

FIG. 15 is a flowchart to explain the procedure of uploading tour record information from the business terminal 4 to the contents server 2. First, the tour guide dealer obtains the memory medium 9 from the user who finished his/her tour and reads out the tour guide contents therefrom using the business terminal 4 (step S300). Next, the business terminal 4 extracts the tour record information from the tour guide contents which have been read (step S305). Note that action history is included in the tour record information.

Now, the business terminal 4 gains access to the contents server 2 (step S310). In response to this, the contents server 2 transmits a login page to the business terminal 4 for use by the tour guide dealer (step S330). The tour guide dealer inputs his/her dealer ID and password on the login page displayed on the business terminal 4 and transmits them to the contents server 2 (step S315).

The contents server 2 receives the dealer's ID and password from the business terminal 4 and authenticates both (step S335). Upon completion of authentication, the contents server 2 transmits an uploaded page to the business terminal 4 (step S340). At the business terminal 4, the tour guide dealer inputs the user ID of the user into the uploaded page transmitted from the contents server 2, while at the same time attaching the tour record information extracted at step S305 thereto and transmitting both to the contents server 2 (step S320).

The contents server 2 receives the uploaded page having the tour record information attached thereto, connects the tour record information to the user ID listed on the uploaded page, and stores these data in the tour record information database 44 (step S345), thus completing the processing.

Figure 16:
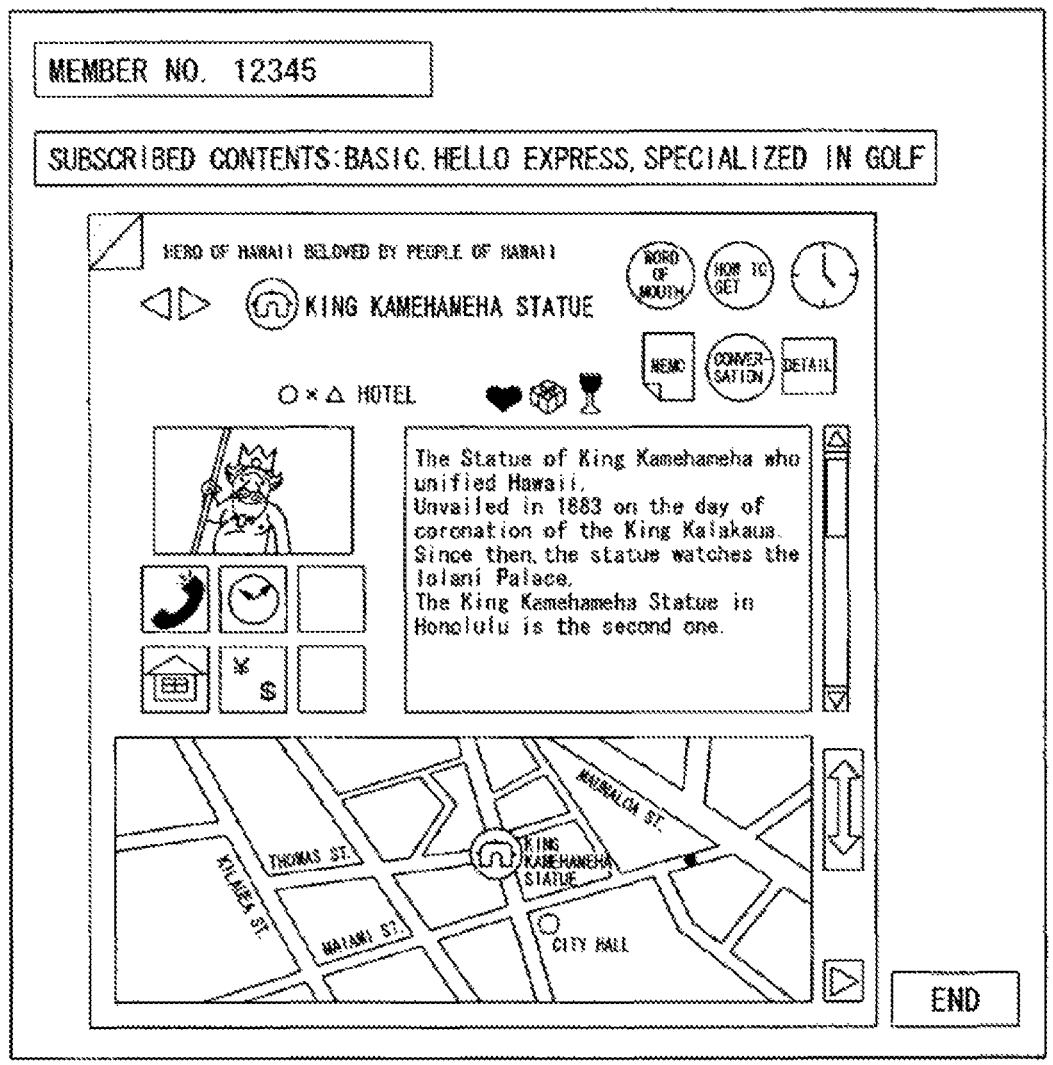
FIG. 16 is a diagram showing an example of a preview screen.

FIG. 16 is a diagram showing an example of a preview screen displayed on the display unit 64 of the user terminal 3. This preview screen is displayed by using a preview function provided on the customized page. Namely, when a prescribed operation is performed on the customized page, the preview screen can be displayed.

It should be noted that for previewing the tour guide contents on the user terminal 3, if the user terminal 3 requires an emulator, this is to be downloaded beforehand from the contents server 2 and installed.

The tour guide contents displayed on the preview screen may be operated by the user terminal 3 in the same way as using the electronic guide apparatus 10. On the electronic guide apparatus 10, an icon on the screen is tapped, whereas on the preview screen, the same operation can be performed by clicking the icon with the mouse 66.

In this manner, by registering the user ID, the tour guide contents applied for can be previewed from a personal computer at home and the like. This makes it possible to confirm at home the tour guide contents, applications and the like to be received at the airport counter 8 on the day of starting a tour. Consequently, it is possible to learn how to operate the system.

FIG. 17 is a diagram showing an example of a customized page. The customized page has a memo button 160, a favorite button 161, a route setting button 162, a save button 163, and a display unit area 165. Above the display unit area 165 there is displayed the user ID of the user as "Member No. 12345"

with a further display of a course name, the "Basic, Hello Express, specialized in Golf," of the guide information selected by the user.

On the display unit area 165, there is displayed the same screen as the screen display on the display unit 92 of the electronic guide apparatus 10. While watching this screen, the user can customize the tour guide contents. The memo button 160, the favorite button 161, and the route setting button 162 are buttons for respectively setting memo information, a favorite registration and a route.

The memo button 160 is a button generating memo information, and this memo information can be connected to a POI. For example, if it is desired to set memo information in the POI 166 displayed on the map of the display unit area 165, the user clicks and selects the icon showing this POI, then clicks the memo button 160. A text input dialog box will pop up to receive an input of memo information. The user may input "Lunch Here!!!" and the like in the text input dialog box and click a setting button displayed on the dialog box. As a result, the text data "Lunch Here!!!" will be set as memo information in the POI 166. The set memo information is displayed on the map as a memo display 167.

Once memo information has been created it may be deleted or its contents may be rewritten. By using this memo function, it is possible to write information in the guide information before the tour. This enables the user to do without fail during the tour what he/she wanted to do before the tour.

When the favorite button 161 is clicked, the favorite mark 168 performs a toggle operation. That is, whenever the favorite button 161 is clicked, the favorite mark 168 repeatedly alternates between a registered state and a non-registered state. By clicking the favorite button 161 to put a favorite mark 168 in the registered state, the currently displayed page (POI information) can be registered as a favorite.

By utilizing the favorite registration function, the user can put a favorite mark on a POI he/she likes or a POI to be checked. This makes it possible to store shops to be visited during the tour in the tour guide contents. By clicking a page forward/backward button 169, a previous page or a next page can be turned to and other pages can be customized as well.

FIG. 18 is a diagram showing an example when setting a route on a customized screen. In the case of route setting, after a route setting button 162 is clicked, two sites on the map are clicked in the order of a departure site and a destination site.

Then, the contents server 2 calculates the best route, which is displayed on the map with an arrow as illustrated. By utilizing the route setting function, it is possible to set a plurality of routes in advance. Hence, a tour can be started quicker than searching for a route after arrival at the site.

After setting memo information, favorite registrations, and routes for each page according to the above-mentioned procedures, the save button 163 is clicked. Then, a signal for confirming the set of contents is transmitted to the contents server 2, whereas the contents server 2 confirms and holds the contents set by the user. In this way, customized tour guide contents are transmitted and stored on the web by the above-mentioned setting of the memo information, favorite registrations and routes, thus enabling the user's personal and original tour guide contents to be taken to the destination.

Figure 19:
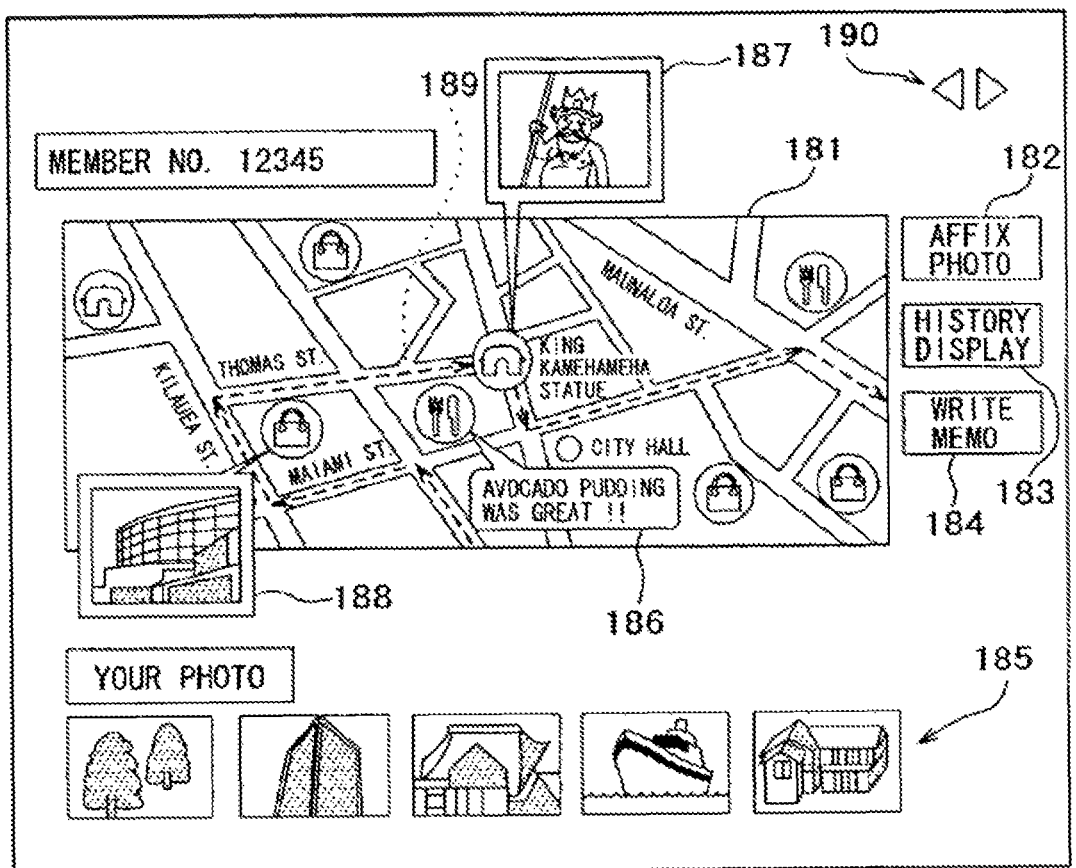
FIG. 19 is a diagram showing an example of an album page.

FIG. 19 is a diagram showing an example of an album page. The album page essentially comprises a map display unit 181, a photo listing unit 185, a photo affix button 182, a history display button 183, a write memo button 184, a page forward/backward button 190 and the like.

In the map display unit 181, there is displayed a map corresponding to an area the user moved to during the tour. The area the user moved to is deduced from the user's action history. In the photo listing unit 185, there is displayed a series of picture image data taken by the user in the area. The picture image data taken by the user in the area is specified by matching the shooting time of the picture image data to the time included in the action history.

After selecting any of the picture images displayed in the photo listing unit 185 by clicking on the picture image, the photo affix button 182 is clicked. As a result, the picture image is displayed on the shooing site on the map, as shown, for example, with picture images 187 and 188. The shooting position is determined from the shooting time of the picture image data and the time included in the action history.

Further, by dragging and dropping a picture image displayed in the photo listing unit 185 onto the map, it is possible to arrange a picture image on the map. In this case, the shooting position determined from the shooting time of the picture image data and the time included in the action history may be different from the position selected by the drag and drop operation.

When the history display button 183 is clicked, a route the user moved through is displayed as an arrow 189. This route is calculated from the action history. After clicking a site on the map, if the write memo button 184 is clicked, a write memo dialog box pops up and inputs memo information on the clicked site. The input memo information is displayed on the map as a written memo 186. By clicking the page forward/backward button 190, the page moves to a preceding or succeeding album page, and editing can be performed in the same way.

By utilizing an album page in this way, namely, by affixing photos personally taken by the user onto a map prepared in advance, showing the user's route in terms of an arrow automatically added to the action history, and writing memo information, the user can create a personal album full of memories.

In the present preferred embodiment, the system is configured so that the picture image data taken by the built-in camera 94 of the electronic guide apparatus 10 is affixed to the album, but the present invention is not limited to this application. It is possible to use picture image data taken by a general-purpose digital camera to create an album page so long as the shooting day and time are recorded. By synchronizing time information from the digital camera with positional information and time information obtained from the GPS 11, the same function as the built-in camera 94 can be realized.

In this case, the memory medium 9 is received from the user at the airport counter 8, while, subject to the user's approval, picture image data recorded in the user's digital camera is copied into the memory medium 9 which is forwarded to the tour guide dealer. When utilizing a user's general-purpose digital camera, in addition to copying picture image data into the memory medium 9 and the like, there is another method whereby the user transmits the picture image data to the contents server 2 from his/her home terminal.

Further, in the present preferred embodiment, the user terminal 3, the business terminal 4, and the contents server 2 are configured so as to be connected via the Internet 5. Be that as it may, it is by no means limited to this. There may be a configuration based on a LAN (Local Area Network) or WAN (Wide Area Network), an optical communications network, a network via a communication satellite or a combination of two or more of these.

Still further, in the present preferred embodiment, a PDA (Personal Digital Assistant) is used as the electronic guide apparatus 10. In addition, other configurations may be established by using a notebook personal computer with a built-in camera, a digital camera, a cellular phone and the like.

In the first preferred embodiment mentioned above, the following effects are expected. First, tour guide contents to be used at the destination can be previewed on the web using a unique user ID for the user to log in. This enables the user to confirm what is contained in the tour guide contents while making tour preparations.

Further, while making tour preparations, memo information can be written concurrently with confirming what is in the contents, so that the tour guide contents are passed on to the user with the memo information written thereto. As if the user has written a memo on a bookmark and affixed it to the tour guidebook, the user can add memo information to the tour guide contents at the time of preview (bookmark creation function). The input memo information is reflected when the electronic guide apparatus 10 is used at an overseas destination and the like.

Still further, before and during the tour, a POI can be registered as a favorite. Also, before and during the tour, the best route can be searched from the destination and departure sites. A track of the user's movements during the tour may be stored as an action history and read (movement history confirmation function). Also, by showing the user's track on the map through the use of the action history, it is possible to insert it on the web.

Furthermore, the user's movement track is left on the map and may be synchronized with a picture image taken by the digital camera using the time as a key. Also, a picture image can be inserted by the user on the web (album page creation function). Namely, the movement track during the tour and the picture image data can be synchronized so that they can be stored and read. As mentioned above, in the present preferred embodiment, the user can enjoy traveling not only during the tour but also before and after the tour.

Moreover, there are other methods of applying the present preferred embodiment as follows:

(1) Positional Information Sharing Function

When engaged in group action in a group tour, it is possible to transmit positional information from one GPS 11 to a plurality of electronic guide apparatus 10, thus sharing positional information by a plurality of electronic guide apparatus 10. Consequently, it is not necessary for each person to carry his/her GPS 11.

(2) Information Exchange Function

By utilizing information exchange communications among terminals, it is possible to exchange a user's action history, guide information based on experience and the like among a plurality of terminals during the tour. In this way, information obtained at a destination can be disclosed to other users. Also, action history and additional user information (favorite route setting, memo and the like) can be shared among a plurality of the electronic guide apparatus 10 during the tour. Note, however, that reproduction of the contents created by the tour agent is restricted.

(3) Radio Update Function by Ground Wave Digital Data Broadcast

By building a ground wave digital tuner integrally in the electronic guide apparatus 10, it is possible to acquire the latest guide information by receiving data broadcast when the tuner is used at the destination. This enables the user to acquire the latest tour guide contents during the tour.

(4) Radio Update Function by Wireless LAN

By incorporating a wireless LAN function in the electronic guide apparatus 10, it is possible to receive data and acquire the latest tour guide contents indoors and inside aircraft.

(5) Indoor Navigation Function

By inputting the current site and the destination, the best route can be displayed on an indoor map. In this way, even in indoor areas such as an airport and a shopping mall, the best route to the destination can be acquired with no need to rely on a sketch or a guideboard.

Variation of the First Preferred Embodiment

Figure 20:
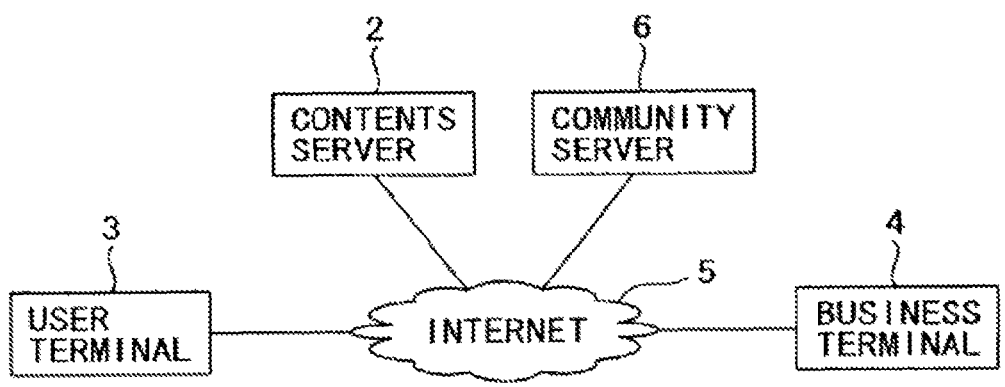
FIG. 20 is a diagram showing an example of a network construction according to a variation of the invention.

FIG. 20 is a diagram showing an example of a network configuration according to a present variation. The present variation essentially comprises a tour guide system with the addition of a community server 6. The airport counter 8, the rental equipment 15 and the like are not illustrated therein.

The community server 6 is server equipment providing a community operating function. A community is, for example, managed in an electronic bulletin board style, and e-mail transmitted by the user is added to the electronic bulletin board. The present variation is so designed that reading of the electronic bulletin board is limited to members only. But it may be so arranged that no limitation is imposed so that it is open to the public.

The community is managed, for example, according to an area, such as Hawaii or Rome, or according to a genre, such as gourmet food or shopping. Information regarding the destination is e-mailed to the community to enable the information to be available to users visiting the destination, or questions are inserted on the electronic bulletin board to obtain the opinions of other users.

Use of the community server 6 makes it possible to disclose an album page, a photo, a tour diary and the like among users. With this function, the tour diaries of other users can be referred to, or a tour diary contest can be held by voting, adding more to the post-tour fun of the users. This also makes it possible to use the community operation to draw customers the next time.

FIG. 21 is a diagram showing an example of an electronic bulletin board inserted on the community server 6. Contributions from a plurality of users can be read on the electronic bulletin board. Although not illustrated, the user can also disclose his/her own album page, photos and the like thereon. Further, the services offered by the community server 6 are not limited to the electronic bulletin board, and, for example, chat and other formats can also be furnished. Still further, the information inserted in the community server 6 may be managed by the tour guide dealers who conduct the rentals and the sales of the information.

Second Preferred Embodiment

In a second preferred embodiment, the user attaches a memory medium 9 to the user terminal 3 and performs downloading (before the tour) of the tour guide contents and uploading (after the tour) of the tour record information. Consequently, the business terminal 4 of the first preferred embodiment is not necessary.

Figure 22:
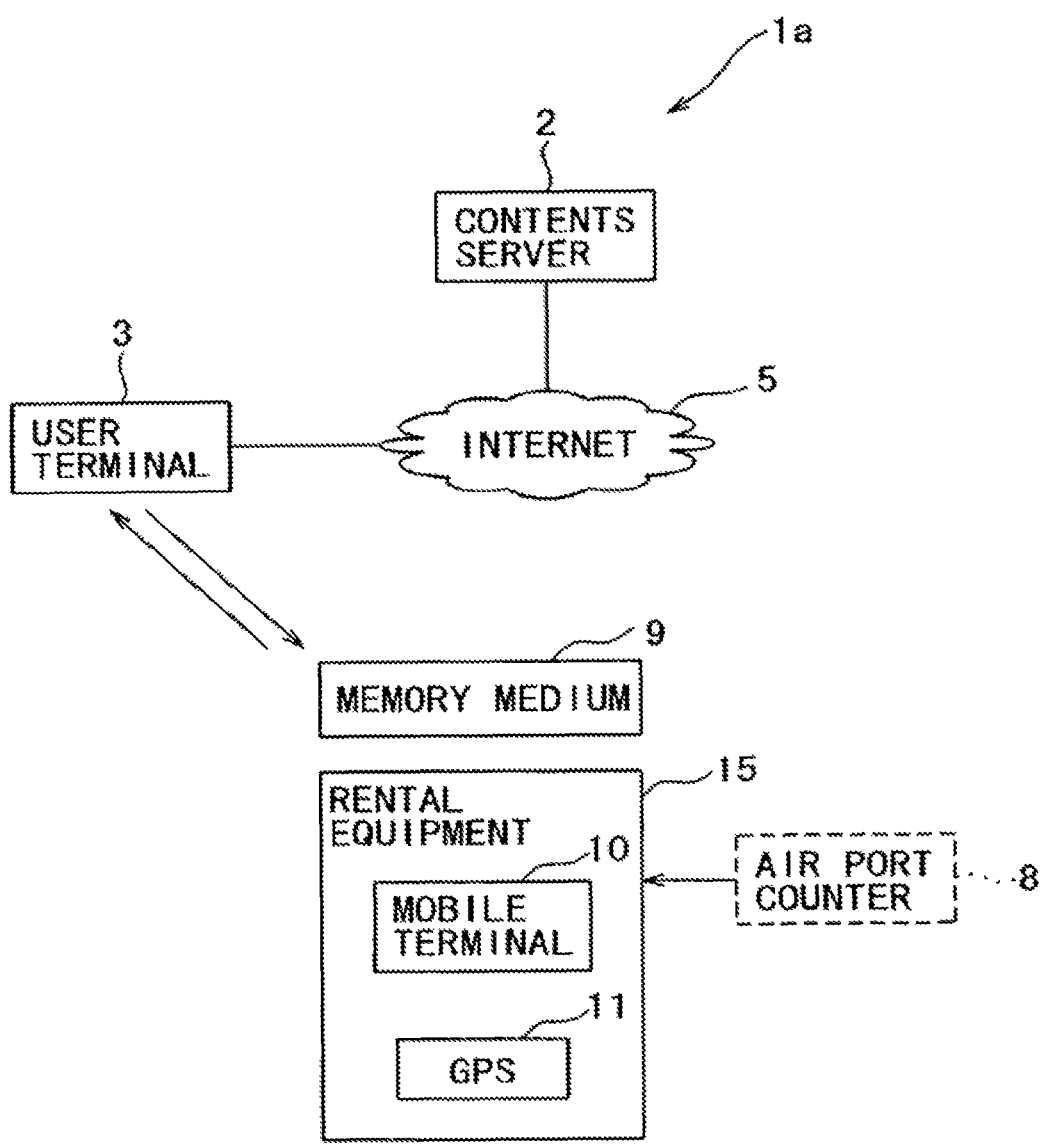
FIG. 22 is a conceptual diagram showing the configuration of a tour guide system according to a second preferred embodiment.

FIG. 22 is a conceptual diagram showing the system configuration of a tour guide system (1*a*) according to the second preferred embodiment. The tour guide system (1*a*) essentially comprises a contents server 2, the Internet 5, a user terminal 3, a memory medium 9, rental equipment 15 and the like. Configuration elements corresponding to the first preferred embodiment are given the same reference numbers and duplicate explanations thereof are omitted.

The user terminal 3 is so designed that the memory medium 9 can be attached to a memory medium drive unit 76, and that a data read/write operation can be performed with respect to the memory medium 9. User registration in the contents server 2 and the customizing of tour guide contents are performed in the same way as in the first preferred embodiment.

The user, after customizing the tour guide contents, downloads the tour guide contents from the contents server 2 to the user terminal 3 and writes them in the memory medium 9. On the day of starting a tour, the user takes the memory medium 9 in which the tour guide contents are stored to the airport. And at the airport counter 8, the user rents rental equipment 15, attaches the memory medium 9, mounts the memory medium 9 onto the electronic guide apparatus 10, and makes use of the tour guide contents at the destination.

When returning to Japan, for example, after the tour is over, the rental equipment 15 is returned to the airport counter 8 and the memory medium 9 is kept by the user. And after the memory medium 9 is attached to the user terminal 3, the tour record information is extracted from the memory medium 9 and transmitted to the contents server 2.

As described above, it is no longer necessary to prepare the business terminal 4 once the user himself/herself has downloaded the tour guide contents and uploaded the tour record information. Further, if the user has his/her own electronic guide apparatus 10 and the GPS 11, there is no need to rent the rental equipment 15 at the airport counter 8.

Figure 23:
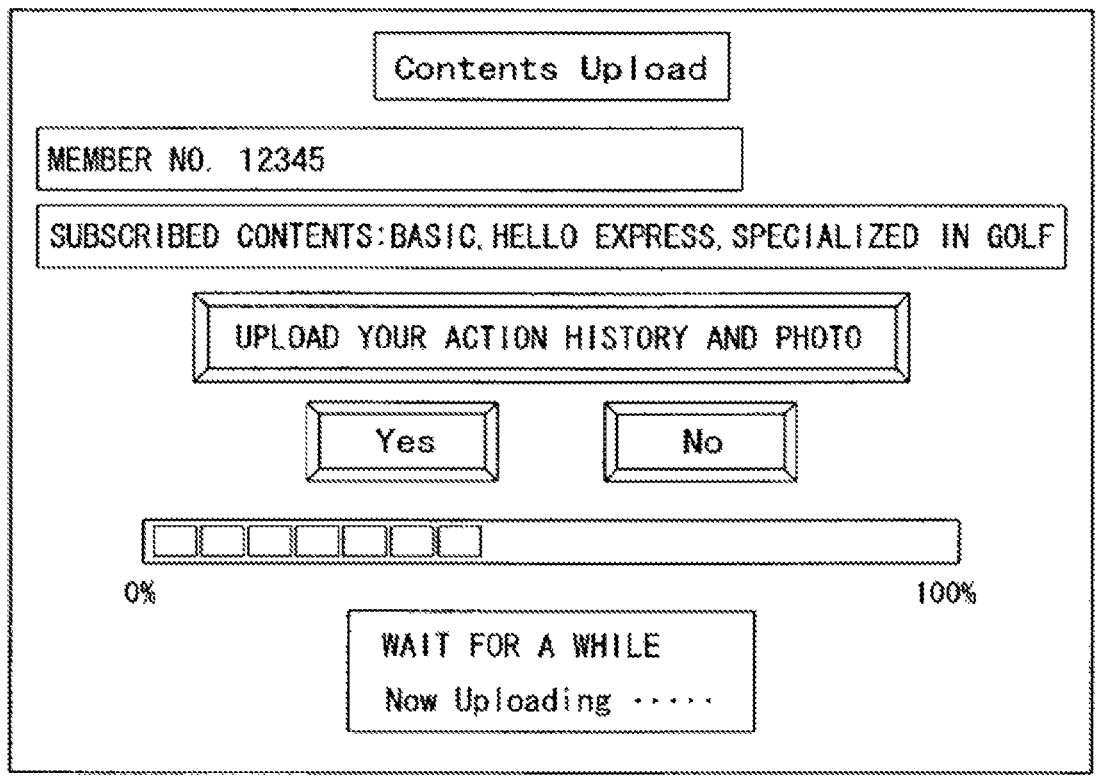
FIG. 23 is a diagram showing a screen to be displayed when the user uploads tour record information to a contents server.

FIG. 23 is a diagram showing a screen displayed on the user terminal 3 when the user uploads the tour record information to the contents server 2. Clicking a "Yes" button therein starts uploading from the memory medium 9 to the contents server 2, and the uploading status is displayed by a display bar.

In the second preferred embodiment described above, all that is required of the business terminal 4 is to manage the contents server 2, and there is no need to download the tour guide contents to the memory medium 9 and upload the tour record information to the contents server 2. In addition, the user can acquire the tour guide contents directly from the user terminal 3. Further, the system may be configured so that the user can own the electronic guide apparatus 10. In such circumstances, there are two cases: downloading from the contents server 2 via the Internet 5 by the user terminal 3; and downloading by connecting an electronic guide apparatus 10 having an Internet connection function directly to the Internet 5.

Third Preferred Embodiment

Tour guidebooks are published by a plurality of publishers in various forms. Accordingly, there is a plurality of guide information even for the same subject. Each tour guidebook has its own characteristics. A tourist takes to the destination a tour guidebook which carries the kind of information he/she wants or a tour guidebook that meets his/her hobby or taste.

Nonetheless, the tour guidebook of company A may have good information on restaurants, while another tour guidebook by company B may be full of hotel information, for example. Since each tour guidebook has its own idea about sufficient information, it is difficult for one tour guidebook to cover all of the information desired by all tourists.

Consequently, the tourist has to take to the destination and carry around a thick tour guidebook which provides a lot of information that has no bearing on his/her tour. For example, when looking for a restaurant, the tourist may take a tour guidebook for restaurants out of his/her baggage and search for the restaurant, and when looking for a stadium, the tourist may take out another tour guidebook for stadiums and look for the stadium. In this way, depending on the use, the user has to utilize various kinds of tour guidebooks.

Now, in a third preferred embodiment, categories such as restaurants, hotels, and duty free shops are included in POI information, and the providers of the POI information are listed as an attribute. For example, for restaurants, the POI information offered by company A may be adopted, while for hotels, the POI information provided by company B may be employed. In this way, POI information is selected per information provider, and the guide information is customized.

The third preferred embodiment will be described below with reference to the drawings. The network configuration of the third preferred embodiment is the same as the first preferred embodiment, hence, the same configuration elements as the first preferred embodiment, such as a contents server 2, a user terminal 3, and a business terminal 4, are given the same reference numbers and descriptions.

FIG. 24 is a table showing an example of a logical composition of the POI information stored in a guide information database 42. As illustrated, the POI information comprises items such as an Item ID 251, an information provider 252, an update date 253, a country name 254, a city name 255, a main classification 256, a middle classification 257, a sub classification 258, a Japanese name 259, text information 260, a photo ad and coupon 261, latitude 262, and longitude 263.

The Item ID 251 is a unique number given to each POI (restaurants, hotels and the like). Each POI can be identified by the Item ID 251. The information provider 252 is the publisher of a tour guidebook which is the source of information on the POI. Also, the information provider 252 furnishes information on information sources to specify the source of the POI information.

In the present preferred embodiment, since the POI information is created from tour guidebooks published by a plurality of publishers, in some cases there are a plurality of information providers for a single POI. Hence, when there is information on a single POI from a plurality of information providers, the user can make a comparison. It should be noted that in the present preferred embodiment, classification is made on the basis of the information provider, but it is not limited to this. Classification may be made per media, such as per book.

The update date 253 represents the latest date the information has been updated. Listing the update date for each POI information facilitates updating old information to new information in regard to the same Item ID. Further, it is possible to indicate on the map the information having the newest update date. By providing the POI information with the update date 253 in this manner, the user can always get the latest information.

Use of the update date 253 this way enables the POI information on the contents server 2 to be updated easily, so that whenever the tour guide contents are downloaded from the contents server, the POI information will the most recent. Also, as overseas radio communication infrastructure improves, real-time updating to the latest information will become possible.

The country name 254 and the city name 255 stand for the name of the country and the name of the city where the POI exists. The main classification 256, middle classification 257, and sub classification 258 are, respectively, the POI classifications of the tour guidebook offered by the information provider, although some do not have these classifications depending on the information source. In that case, the code is provided at the time of producing the contents. The main classification 256, the middle classification 257, and the sub classification 258 are contents information to be classified according to the contents.

The Japanese name 259 is a Japanese writing of a name of the POI. If the POI is a restaurant, it corresponds to the restaurant name in Japanese. The text information 260 is commentary information on the POI and information in characters regarding the address, telephone number, business hours and the like of the POI.

The photo ad and coupon 261 is not restricted to what is obtained from the tour guidebook, but, for example, what the POI offered for the tour guide contents is equally usable. The latitude 262 and the longitude 263 are positional information showing, respectively, the latitude and longitude of the current site of the POI.

As mentioned above, having information together from a plurality of information providers makes it possible to provide to the user information composed of different contents with regard to a store on the same latitude and longitude. As a result, the user can display and read different information from the information providers on the same map depending on his/her hobbies and tastes; for example, information from the provider A may be used for restaurant information, while information from the provider B may be used for shopping information. Further, information from different information providers regarding a single store can be read and the listed contents (photos, ads, coupons) can be compared.

FIG. 25 is a diagram showing an example of a selection page to be displayed on the user terminal 3 when selecting the information providers. The information provider selection pages include POI information categories in a horizontal row, while the information providers are disposed in a vertical column. For the POI information category to be selected, the middle classification 257 (FIG. 24) of the POI information is used.

By clicking with a mouse operation a square formed by the intersection of a category of the POI information and an information provider, the user can select an information provider for that category. A selected state is shown with a circle in the drawing, and the selected state is subject to a toggle operation. For example, as the user clicks the same square, selection and selection cancel are alternately performed.

An example of the selection process is as follows. The POI information of the provider A is used for restaurants, the POI information of the provider B is used for hotels and museums, and the POI information of the provider C is used for duty free shops. In the above-mentioned setting, if the preview/customizing means 34 generates the tour guide contents for the user, the POI information of the provider A in regard to restaurants, the POI information of the provider B in regard to hotels and museums, and the POI information of the provider C in regard to duty free shops are inserted in the tour guide contents. Namely, the user acquires information to specify a combination (combined information) of the information provider with the category set by the user terminal, and uses this combined information to focus on the POI information. Accordingly, the preview/customizing means 34 essentially comprises combined information acquisition means, focusing means, guide contents generation means, and contents output means.

The tour guide contents thus generated are displayed on the preview page. Then, for example, suppose that the POI information of the provider A is selected with respect to restaurants, the POI information of the provider B is selected with respect to hotels and museums, and the POI information of the provider C is selected with respect to duty free shops. In that case, an icon representing the POI information of the provider A for restaurants, an icon representing the POI information of the provider B for hotels and museums, and an icon representing the POI information of the provider C for duty free shops are laid out on the map using positional information.

In this manner, information of different information providers can be selectively displayed for reading on the same map. When the restaurant icon is tapped on the map, the POI information of the provider A regarding the restaurant is displayed. Further, if the tour guide contents are displayed on the electronic guide apparatus 10, the same display as the preview page appears.

Figure 26:
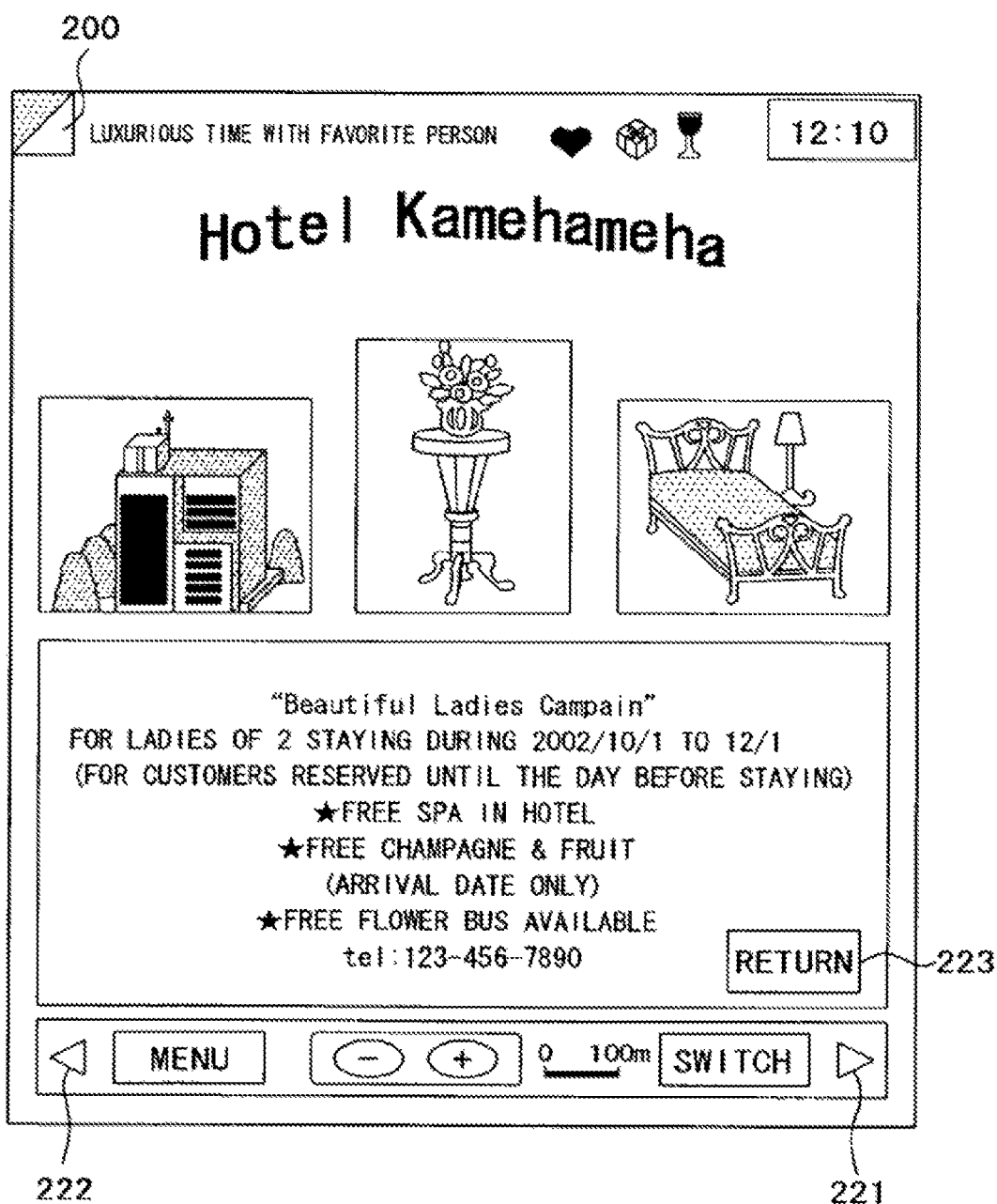
FIG. 26 is a diagram showing an example of an advertising page.

FIG. 26 shows where an ad page by the photo ad and coupon 261 is displayed on the display unit 92 of the electronic guide apparatus 10. The ad page, for example, is displayed when the ad button 156 (FIG. 10) is tapped. As illustrated, the ad page also can be registered as a favorite, and a favorite mark 200 can be set. When the return button 223 or the page backward button 222 is tapped, the page prior to displaying the ad page appears. Also, when the page forward button 221 is tapped, the page subsequent to the ad page appears.

As described above, according to the present preferred embodiment, the following effects can be delivered. The POI information can be selectively displayed per provider with respect to categories. Accordingly, information of different information providers can be displayed for reading on the same map depending on the user's hobbies and tastes. Further, it is possible to read information of different information providers regarding the same shop and compare what is listed.

Still further, by using the update date attached to the POI information, management of the POI information so as to keep it as new as possible at all times can be facilitated. Advertising information from the tour guidebook can be attached to the POI information. In addition, it is possible to have an advertising frame from a store itself in the POI information.

Fourth Preferred Embodiment

In a fourth preferred embodiment, the electronic guide apparatus 10 has the POI information of each information provider based on the logical construction shown in FIG. 24, and the user selects on the electronic guide apparatus 10 the POI information for a category based on the information provider.

When selecting an information provider on the electronic guide apparatus 10, the same information provider selection page as shown in FIG. 25 is displayed on the display unit 92 of the electronic guide apparatus 10. For example, by tapping with a finger tip a square formed by intersecting lines from a POI information category and an information provider, the user can select an information provider for that category.

In the same way as the third preferred embodiment, the POI information of the provider A may be selected regarding restaurants, the POI information of the provider B may be selected regarding hotels and museums, and the POI information of the provider C may be selected regarding duty free shops. In this case, an icon displayed on the map of the guide screen becomes an icon of the POI information of the provider A as regards restaurants, it becomes an icon of the POI information of the provider B as regards hotels and museums, and it becomes an icon of the POI information of the provider C as regards duty free shops. Further, when the restaurant icon is tapped on the map, the POI information of the provider A regarding the restaurant is displayed.

Figure 27A:
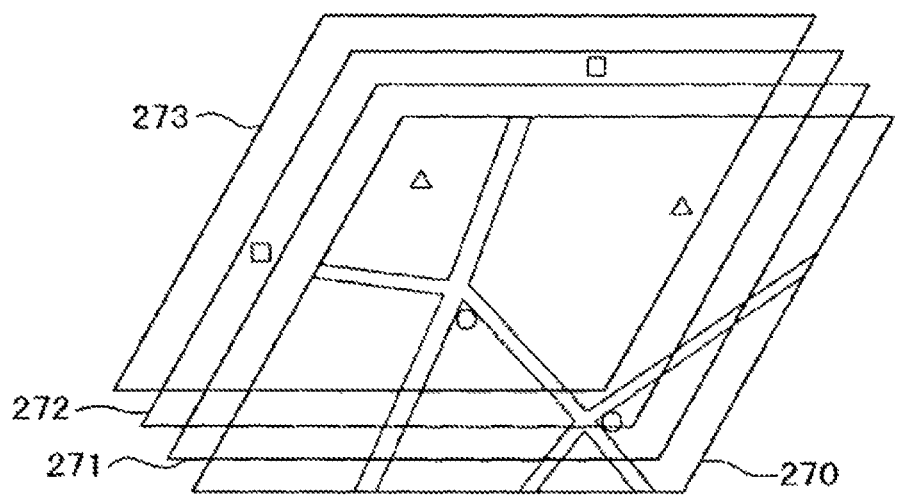
FIGS. 27A to 27B are diagrams explaining conceptually a case of selectively displaying POI information of different information providers on a guide screen.
Figure 27B:
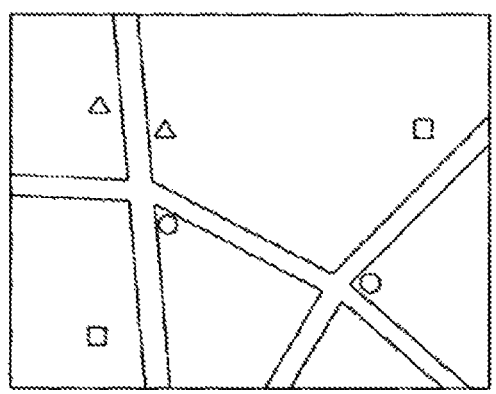

FIGS. 27A and 27B are diagrams for explaining conceptually a case of selectively displaying the POI information of different information providers on the guide screen of the electronic guide apparatus 10. FIG. 27A shows a map 270, a layer 271 displaying an icon of the provider A, a layer 272 displaying an icon of the provider B, and a layer 273 displaying an icon of the provider C.

Each layer is a transparent sheet, and each information provider can put its icon on display or out of display on respective sheets. For example, of the POI information offered by the provider A, suppose that restaurants are set on display and other categories (hotels, duty free shops and the like) are set out of display. On the layer 271, of the icons regarding the POI information offered by the provider A, those icons regarding hotels are displayed, while those icons belonging to other categories are not displayed.

As described above, the icons of restaurants (POI information offered by the provider A) are displayed on the layer 271, the icons of hotels (POI information offered by the provider B) are displayed on the layer 272, and the icons of duty free shops (POI information offered by the provider C) are displayed on the layer 273. When the map 270 is looked at through each layer, as shown in FIG. 27B, icons indicating the POI information of a plurality of information providers are selectively displayed on one map.

Namely, on the map shown in FIG. 27B, the icons regarding restaurants correspond to the POI information offered by the provider A, the icons regarding hotels correspond to the POI information offered by the provider B, and the icons regarding duty free shops correspond to the POI information offered by the provider C.

In the electronic guide apparatus 10, the above mentioned setup is utilized to display selectively on the guide screen the POI information of the information providers, so that when the user makes a selection by tapping an icon, the POI information corresponding to the icon comes on display. These functions operate as the CPU 86 of the electronic guide apparatus 10 performs in accordance with the control software of the tour guide contents. The electronic guide apparatus 10 is provided with means for acquiring combined information of information providers and categories, focusing means for narrowing down the POI information by the combined information, matching means for matching positional information of the POI information to positional information on the map, and display means for laying out the POI information on the map and displaying it. Further, the electronic guide apparatus 10 includes contents utilization means for using the tour guide contents by activating the control software.

Figure 28:
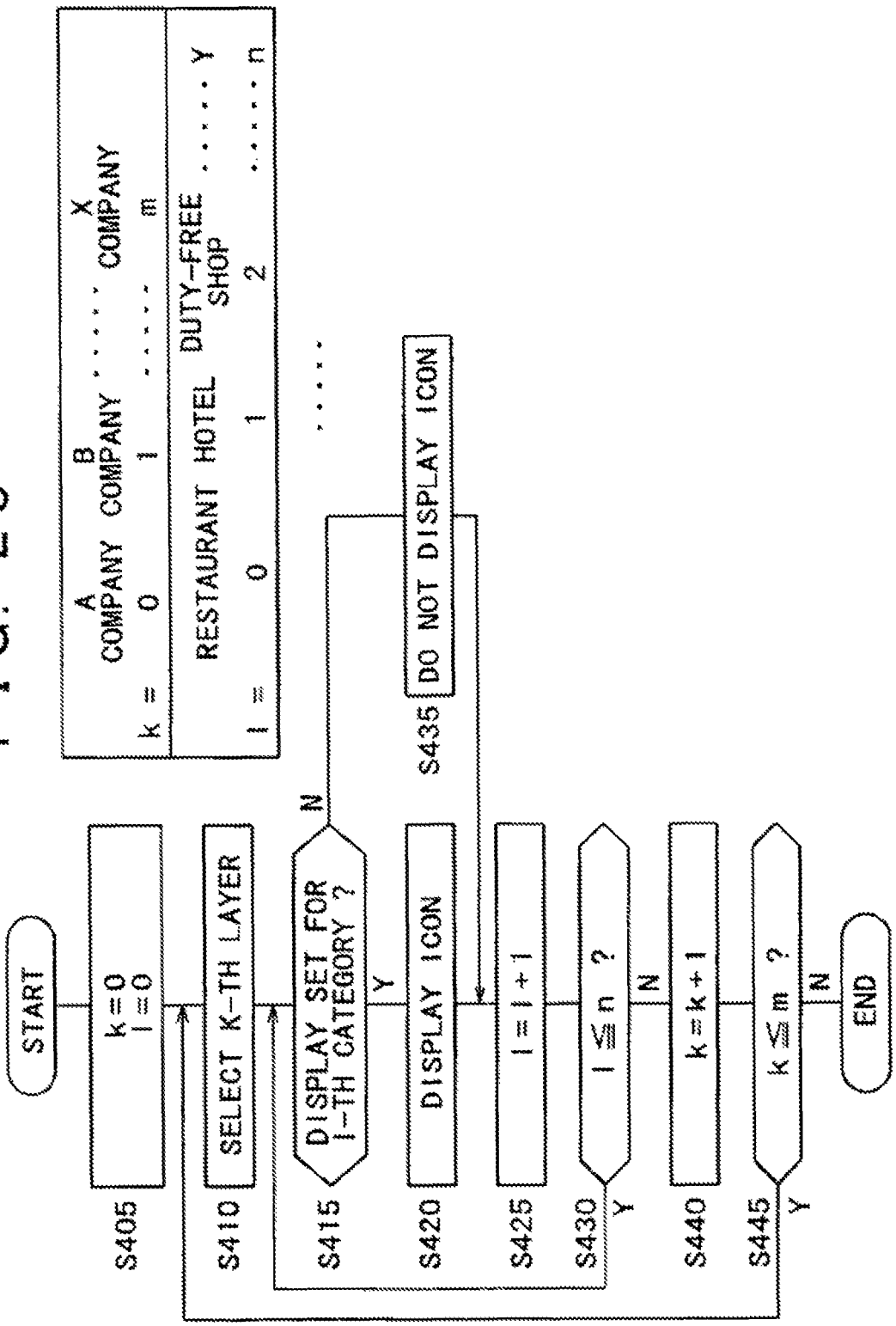
FIG. 28 is a flowchart explaining a process of selectively displaying an icon per information provider.

FIG. 28 is a flowchart for explaining the procedure of selectively displaying an icon per information provider. It should be noted that the procedure described below is performed by the CPU 86 (FIG. 6) according to the control software stored in the control software directory 107 (FIG. 7). Further, in the following description, as shown on the right side of the flowchart, serial numbers from 0 to m are attached to information providers. A code k is set for this. Also, serial numbers from 0 to n are given to categories, and a code l is set for this.

First, assume k=0, l=0, and the CPU 86 initializes k and l (step S405). Next, the CPU 86 selects the k-th layer (step S410). Then the CPU 86 accesses a memory medium that stores an item selected by the user through an information provider selection screen and determines at the k-th layer whether an icon is set for display at the l-th category (step S415).

If there is a display setting (step S415; Y), the CPU 86 displays on the guide screen an icon belonging to the category from among the POI information of the information provider to which the layer belongs (step S435). If there is no display setting (step S415; N), the CPU 86 does not display an icon (step S435). Next, the CPU 86 increases the code l by one increment (step S425).

Now, the CPU 86 determines whether the code l is under n, and if the code l is under n (step S430; Y), the process is returned to step S415 and processing continues. If the code l is not under n (step S430; N), the code k is increased by one increment (step S440). Then, the CPU 86 determines whether the code k is under m, and if the code k is under m (step S445; Y), the process is returned to step S410 and processing continues. If the code k is not under m (step S445; N), processing is completed.

By the above-mentioned processing, the electronic guide apparatus 10 can selectively provide POI information regarding an information provider. As a result, the user can read and display on the same map information of different information providers depending on his/her hobbies and tastes.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

For example, one unit of the GPS 11 can be shared by a plurality of electronic guide apparatus 10. When traveling in a group, so long as one member of the group carries the GPS 11, all that is required of other users is to carry only the electronic guide apparatus 10.

Further, although the present embodiment is marked by the use of a PDA as an electronic guide apparatus, it is not limited to the PDA. For example, a notebook personal computer, a digital camera, a digital video camera, and a cellular phone (typically equipped with a liquid crystal display), and any other device having a CPU and a display screen may be used with equally excellent results.

Furthermore, in the present embodiment, tour guide contents are used as an example, but it is not limited to such example. So long as information is selectively displayed according to category and other attribute information, other devices are quite serviceable. For example, some book reviews comprise reviews of a plurality of critics in regard to the same book. Take, for instance, mystery and detective stories. A review on mystery stories by a critic A can be displayed, while a review by a critic B is displayed on detective stories.

According to the present invention, a tourist can enhance the value of traveling. Additional objects, advantages and novel features of the invention will become more apparent to the user upon examination of the following or may be learned by practice of the invention.

What is claimed:

1. A device comprising:
   a display unit to control display of a map on a screen display, wherein the map includes an area through which a user moved and one or more routes in the area determined from map data,
   wherein the display unit is operable to control plotting on the map displayed on the screen display of a user route the user moved through based on user action history information representative of the user route the user moved through, wherein the user action history information includes positional information identifying user positions and wherein the user route is displayed on the map by plotting markings over the map to show a movement track of the user, the markings being plotted based on the positional information identifying user positions, wherein the display unit is operable to control display of a thumbnail of an image, the image taken by the user in the area, on the same screen display with the map displayed with the markings showing the movement track of the user and in a display area external to the map, the thumbnail specified to be displayed in the display area based on shooting time of the image and time information in the user action history identifying times at which the user is located at respective positions, and wherein the display unit is operable to control display of the thumbnail, in response to user operation, to be laid out on a site on the map displayed on the same screen display with the markings showing the movement track of the user, the site corresponding to the location at which the image is taken, based on shooting time of the image and time information in the user action history identifying times at which the user is located at respective positions.

2. The device of claim 1 further comprising:
a matching unit to match the positional information included with the user action history information to positional information defining the map.

3. The device of claim 1 further comprising:
an information acquisition unit to acquire site information including positional information specifying a position of a site,
wherein the user action history information includes information representative of the route the user moved through including the site, and
wherein the display unit is operable to control display on the map of the route the user moved through including the site, based on the user action history information, and the site information, based on the positional information included with the site information.

4. The device of claim 3 further comprising:
a matching unit to match the positional information included with the site information to positional information defining the map.

5. The device of claim 1 further comprising:
a memory to store the user action history information; and
a generating unit to generate the user action history information based on movement of the device.

6. A method comprising:
controlling, by a processor, display of a map on a screen display, wherein the map includes an area through which a user moved and one or more routes in the area determined from map data;
controlling, by the processor, plotting on the map displayed on the screen display of a user route the user moved through based on user action history information representative of the user route the user moved through, wherein the user action history information includes positional information identifying user positions and wherein the user route is displayed on the map by plotting markings over the map to show a movement track of the user, the markings being plotted based on the positional information identifying user positions;
controlling display of a thumbnail of an image, the image taken by the user in the area, on the same screen display with the map displayed with the markings showing the movement track of the user and in a display area external to the map, the thumbnail specified to be displayed in the display area based on shooting time of the image and time information in the user action history identifying times at which the user is located at respective positions, and
controlling display of the thumbnail, in response to user operation, to be laid out on a site on the map displayed on the same screen display with the markings showing the movement track of the user, the site corresponding to the location at which the image is taken, based on shooting time of the image and time information in the user action history identifying times at which the user is located at respective positions.

7. The method of claim 6 further comprising:
matching the positional information included with the user action history information to positional information defining the map.

8. The method of claim 6 further comprising:
acquiring site information including positional information specifying a position of a site, wherein the user action history information includes information representative of the route the user moved through including the site; and
controlling display on the map of the route the user moved through including the site, based on the user action history information, and the site information, based on the positional information included with the site information.

9. The method of claim 8 further comprising:
matching the positional information included with the site information to positional information defining the map.

10. The method of claim 6 further comprising:
storing the user action history information; and
generating the user action history information based on movement of a device.

11. A non-transitory computer readable medium storing a program causing a computer to execute a process, the process comprising:
controlling display of a map on a screen display, wherein the map includes an area through which a user moved and one or more routes in the area determined from map data;
controlling plotting on the map displayed on the screen display of a user route the user moved through based on user action history information representative of the user route the user moved through, wherein the user action history information includes positional information identifying user positions and wherein the user route is displayed on the map by plotting markings over the map to show a movement track of the user, the markings being plotted based on the positional information identifying user positions;
controlling display of a thumbnail of an image, the image taken by the user in the area, on the same screen display with the map displayed with the markings showing the movement track of the user and in a display area external to the map, the thumbnail specified to be displayed in the display area based on shooting time of the image and time information in the user action history identifying times at which the user is located at respective positions; and
controlling display of the thumbnail, in response to user operation, to be laid out on a site on the map displayed on the same screen display with the markings showing the movement track of the user, the site corresponding to the location at which the image is taken, based on shooting time of the image and time information in the user action history identifying times at which the user is located at respective positions.

12. A device comprising:
a display unit to control a display to display a thumbnail of an image in a thumbnail display area and a map corresponding to position information of an image in a map display area,
wherein the thumbnail is displayed according to time information of the image, the image taken by the user, in the thumbnail display area,
wherein the map is overlapped with a user route based on user action history information, wherein an icon corresponding to the image is displayed, on the user route, according to the time information of the image and time information of the user action history information, and wherein by drag and drop the thumbnail of the image displayed in the thumbnail display area onto a site in the map display area, the icon is displayed corresponding to the thumbnail on a site in the map display area.

13. The device of claim 12 further comprising:

a memory to store the user action history information; and a generating unit to generate the user action history information based on movement of the device.

14. A method comprising:

controlling, by the processor, a display to display a thumbnail of an image in a thumbnail display area and a map corresponding to position information of an image in a map display area, wherein the thumbnail is displayed according to time information of the image, the image taken by the user, in the thumbnail display area, wherein the map is overlapped with a user route based on user action history information, wherein an icon corresponding to the image is displayed, on the user route, according to the time information of the image and time information of the user action history information, and wherein by drag and drop the thumbnail of the image displayed in the thumbnail display area onto a site in the map display area, the icon is displayed corresponding to the thumbnail on a site in the map display area.

15. The method of claim 14 further comprising: storing the user action history information; and generating the user action history information based on movement of a device.

16. A non-transitory computer readable medium storing a program causing a computer to execute a process, the process comprising:

controlling a display to display a thumbnail of an image in a thumbnail display area and a map corresponding to position information of an image in a map display area, wherein the thumbnail is displayed according to time information of the image, the image taken by the user, in the thumbnail display area, wherein the map is overlapped with a user route based on user action history information, wherein an icon corresponding to the image is displayed, on the user route, according to the time information of the image and time information of the user action history information, and wherein by drag and drop the thumbnail of the image displayed in the thumbnail display area onto a site in the map display area, the icon is displayed corresponding to the thumbnail on a site in the map display area.

17. The computer readable medium of claim 16, wherein the process comprises:

matching positional information included with the user action history information to positional information defining the map.

18. The computer readable medium of claim 16, wherein the process comprises:

acquiring site information including positional information specifying a position of a site, wherein the user action history information includes information representative of the route the user moved through including the site specified by the site information, and controlling display on the map of the route the user moved through including the site specified by the site information, based on the user action history information, and the site information, based on positional information included with the site information.

19. The computer readable medium of claim 18, wherein the process comprises:

matching the positional information included with the site information to positional information defining the map.

20. The computer readable medium of claim 18, wherein the process comprises:

storing the user action history information; and generating the user action history information based on movement of a device.

* * * * *